(12) United States Patent
Wakita et al.

(10) Patent No.: US 11,514,600 B2
(45) Date of Patent: Nov. 29, 2022

(54) INFORMATION PROCESSING DEVICE AND INFORMATION PROCESSING METHOD

(71) Applicant: SONY CORPORATION, Tokyo (JP)

(72) Inventors: Yoshihiro Wakita, Tokyo (JP); Atsushi Okamori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 280 days.

(21) Appl. No.: 16/475,749

(22) PCT Filed: Nov. 30, 2017

(86) PCT No.: PCT/JP2017/043011
§ 371 (c)(1),
(2) Date: Jul. 3, 2019

(87) PCT Pub. No.: WO2018/154902
PCT Pub. Date: Aug. 30, 2018

(65) Prior Publication Data
US 2021/0295550 A1 Sep. 23, 2021

(30) Foreign Application Priority Data
Feb. 22, 2017 (JP) ............................. JP2017-030858

(51) Int. Cl.
*G06K 9/00* (2022.01)
*G06T 7/70* (2017.01)
(Continued)

(52) U.S. Cl.
CPC .................. *G06T 7/70* (2017.01); *G06T 7/20* (2013.01); *H04N 5/30* (2013.01)

(58) Field of Classification Search
CPC ........................................................ G06T 7/70
See application file for complete search history.

(56) References Cited

U.S. PATENT DOCUMENTS 9,609,197 B1* 3/2017 Stepanenko ............ G06T 5/006
2010/0002071 A1* 1/2010 Ahiska .................. H04N 5/3572
348/240.99

(Continued)

FOREIGN PATENT DOCUMENTS

CN 104685861 A 6/2015
EP 2905953 A1 8/2015
(Continued)

OTHER PUBLICATIONS

International Search Report and Written Opinion of PCT Application No. PCT/JP2017/043011, dated Feb. 20, 2018, 09 pages of ISRWO.

(Continued)

*Primary Examiner* — Oneal R Mistry
(74) *Attorney, Agent, or Firm* — Chip Law Group

(57) ABSTRACT

An information processing device including an acquiring unit that acquires information related to a feature quantity specifying a predetermined target transmitted from a terminal device held by the target, a specifying unit that specifies the target on the basis of the information related to the feature quantity from among images captured by at least some of a plurality of imaging devices installed at different positions, and a control unit that presents information related to the target to a predetermined output destination in accordance with a specifying result of the target from the image.

17 Claims, 22 Drawing Sheets

(51) Int. Cl.
    *G06T 7/20*     (2017.01)
    *H04N 5/30*     (2006.01)

(56)     References Cited

U.S. PATENT DOCUMENTS

| | | | |
|---|---|---|---|
| 2013/0230240 A1* | 9/2013 | Muninder | G06V 10/811 |
| | | | 382/165 |
| 2015/0281568 A1 | 10/2015 | Kamada et al. | |
| 2017/0090560 A1* | 3/2017 | Chen | H04N 21/42224 |
| 2017/0091560 A1* | 3/2017 | Miwa | G06T 7/70 |
| 2017/0126907 A1 | 5/2017 | Tamura et al. | |
| 2017/0294089 A1* | 10/2017 | Miwa | G08B 25/005 |
| 2017/0352256 A1* | 12/2017 | Miwa | G06K 19/10 |

FOREIGN PATENT DOCUMENTS

| | | |
|---|---|---|
| EP | 3153976 A1 | 4/2017 |
| JP | 04-074285 A | 3/1992 |
| JP | 2002-112074 A | 4/2002 |
| JP | 2009-049518 A | 3/2009 |
| JP | 2010-238196 A | 10/2010 |
| JP | 2015-041194 A | 3/2015 |
| WO | 2014/054342 A1 | 4/2014 |
| WO | 2015/186447 A1 | 12/2015 |

OTHER PUBLICATIONS

Office Action for JP Patent Application No. 2019-501060, dated Dec. 7, 2021, 05 pages of English Translation and 05 pages of Office Action.

* cited by examiner

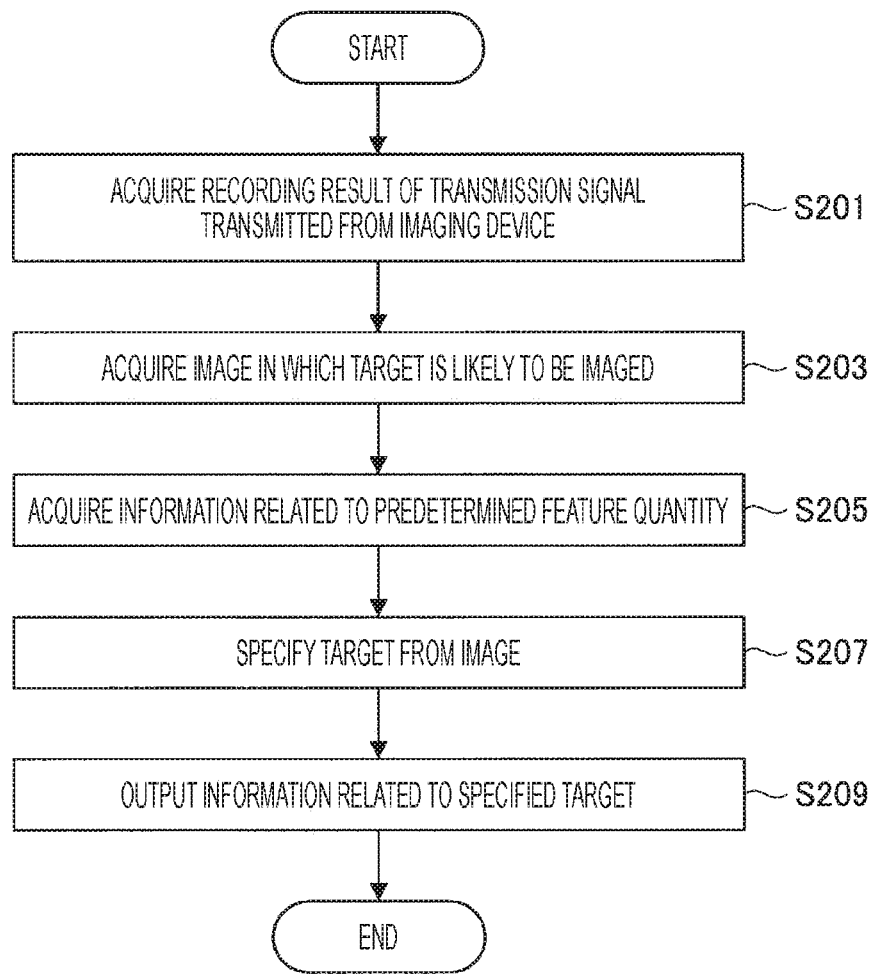

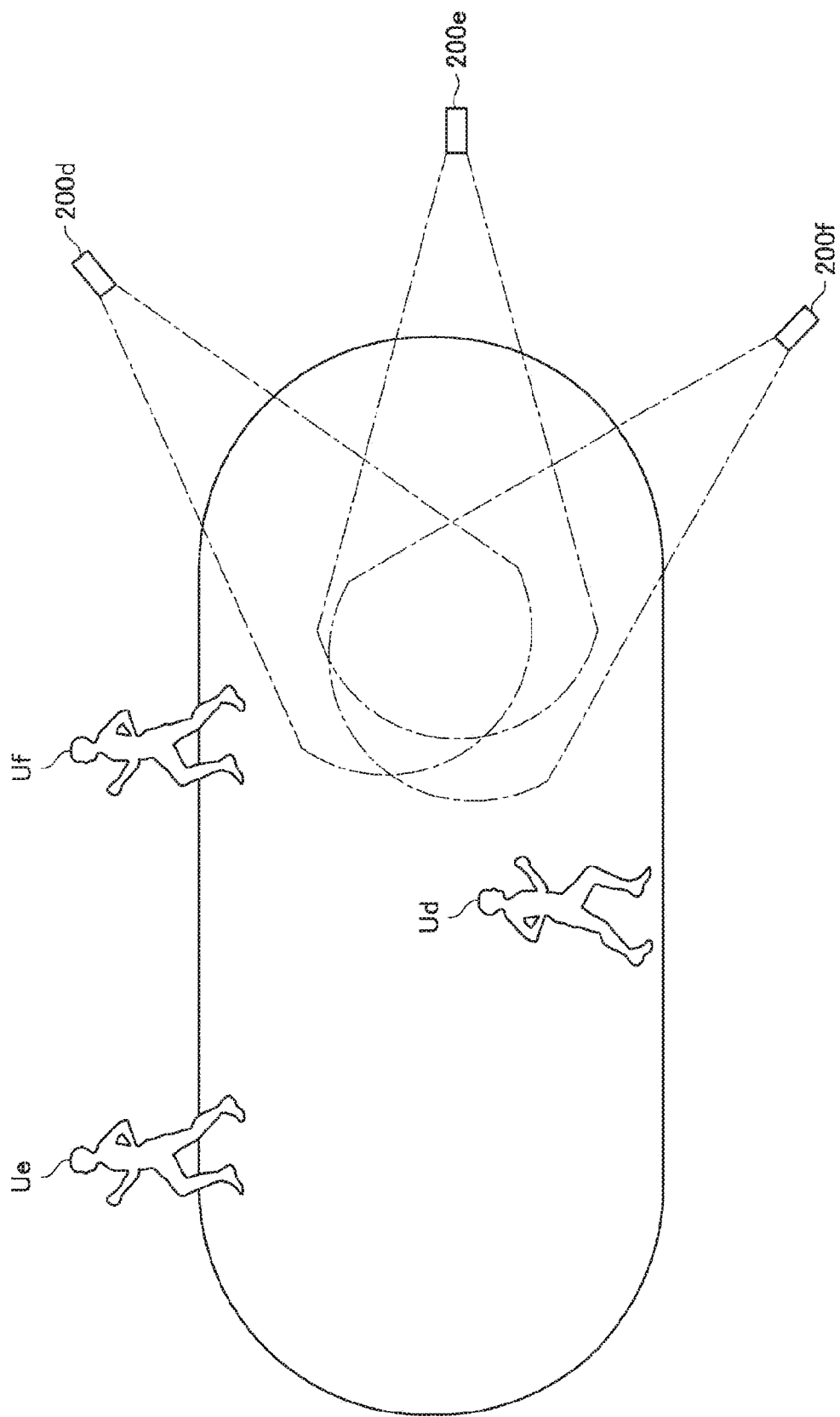

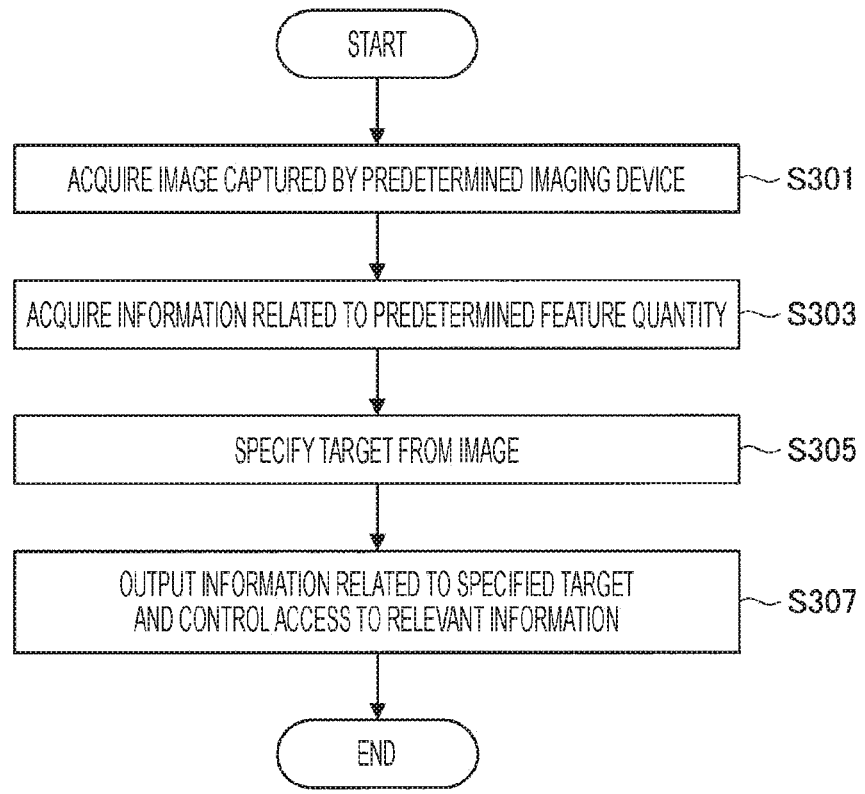
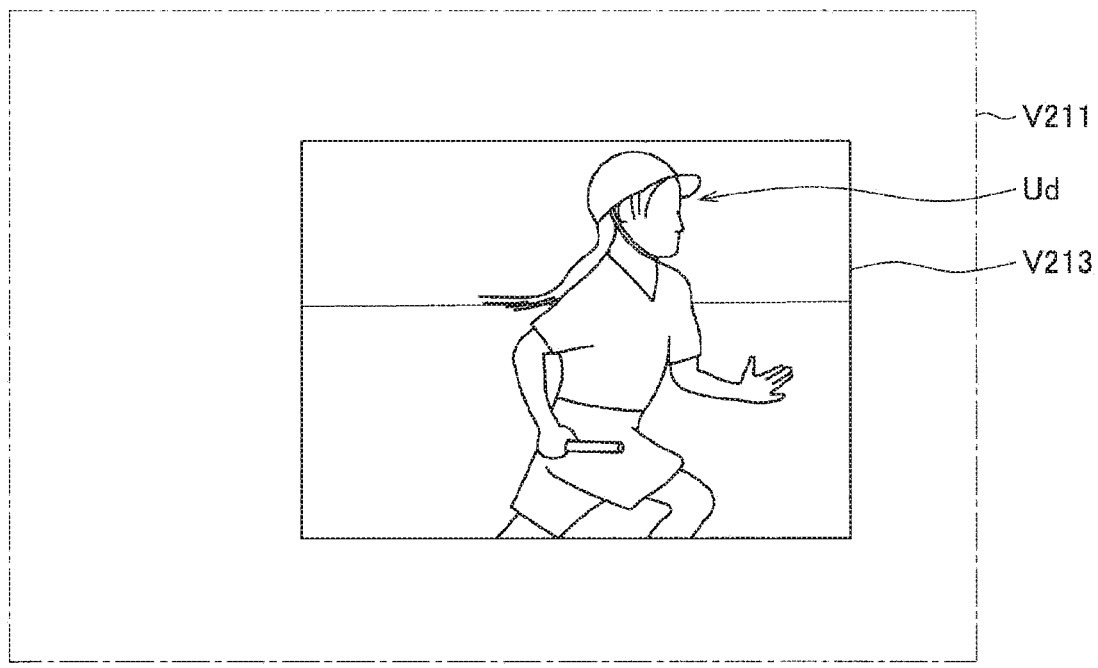

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/043011 filed on Nov. 30, 2017, which claims priority benefit of Japanese Patent Application No. JP 2017-030858 filed in the Japan Patent Office on Feb. 22, 2017. Each of the above-referenced applications is hereby incorporated herein by reference in its entirety.

TECHNICAL FIELD

The present disclosure relates to an information processing device, an information processing method, and a program.

BACKGROUND ART

Imaging devices such as digital still cameras or digital video cameras (hereinafter generally referred to as "digital cameras") have widespread. Further, the imaging devices are not limited to ones owned by individuals, and for example, there are imaging devices which are steadily installed at predetermined positions such as so-called surveillance cameras or environmental cameras, and there are imaging devices which are installed in public spaces such as towns.

Further, in recent years, the use purposes of imaging devices have also diversified, and for example, with the development of image analysis technology or various recognition technologies, in addition to simply capturing an image, the applications to various types of recognition systems that recognize predetermined targets such as a person and an object on the basis of a captured image are also under review.

Further, in recent years, with the development of communication technology, it has become possible to cause not only so-called communication devices but also various devices existing in the world to be connected to networks such as the Internet, a local area network (LAN), and a wide area network (WAN). Therefore, many systems that can provide various types of services by allying various devices connected to a network with each other are also under review. For example, an example of a surveillance system using an imaging device such as a surveillance camera connected via a network is disclosed in Patent Document 1.

CITATION LIST

Patent Document

Patent Document 1: Japanese Patent Application Laid-Open No. 2009-49518

SUMMARY OF THE INVENTION

Problems to be Solved by the Invention

By the way, with the spread of imaging devices such as digital cameras, a situation in which a specific target (subject) is imaged by a plurality of imaging devices installed at different positions has recently increased. From such a background, there is a demand for implementation of a mechanism of specifying images in which a desired target is imaged from images captured by a plurality of imaging devices installed in various places and enabling a specifying result to be usable for provision of various types of services.

In this regard, the present disclosure proposes an information processing device, an information processing method, and a program which are capable of enabling information related to a predetermined target imaged in images captured by a plurality of imaging devices to be usable in a more appropriate form using the images.

Solutions to Problems

According to the present disclosure, provided is an information processing device including an acquiring unit that acquires information related to a feature quantity specifying a predetermined target transmitted from a terminal device held by the target, a specifying unit that specifies the target on the basis of the information related to the feature quantity from among images captured by at least some of a plurality of imaging devices installed at different positions, and a control unit that presents information related to the target to a predetermined output destination in accordance with a specifying result of the target from the image.

Further, according to the present disclosure, provided is an information processing method performed by a computer including acquiring information related to a feature quantity specifying a predetermined target transmitted from a terminal device held by the target, specifying the target on the basis of the information related to the feature quantity from among images captured by at least some of a plurality of imaging devices installed at different positions, and presenting information related to the target to a predetermined output destination in accordance with a specifying result of the target from the image.

Further, according to the present disclosure, provided is a program causing a computer to execute acquiring information related to a feature quantity specifying a predetermined target transmitted from a terminal device held by the target, specifying the target on the basis of the information related to the feature quantity from among images captured by at least some of a plurality of imaging devices installed at different positions, and presenting information related to the target to a predetermined output destination in accordance with a specifying result of the target from the image.

Effects of the Invention

As described above, according to the present disclosure, an information processing device, an information processing method, and a program which are capable of enabling information related to a predetermined target imaged in images captured by a plurality of imaging devices to be usable in a more appropriate form using the images are provided.

Incidentally, the above effects are not necessarily limited, and effects described in this specification or other effects that can be understood from this specification may be included in addition to or instead of the above effects.

BRIEF DESCRIPTION OF DRAWINGS

FIG. 9 is a flowchart illustrating an example of a flow of a series of processes of an information processing system according to the embodiment.

FIG. 10 is an explanatory diagram for describing an overview of an information processing system according to a third embodiment of the present disclosure.

FIG. 11 is a flowchart illustrating an example of a flow of a series of processes of an information processing system according to the embodiment.

FIG. 12 is an explanatory diagram for describing an example of an information processing system according to the embodiment.

MODE FOR CARRYING OUT THE INVENTION

Figure 1:
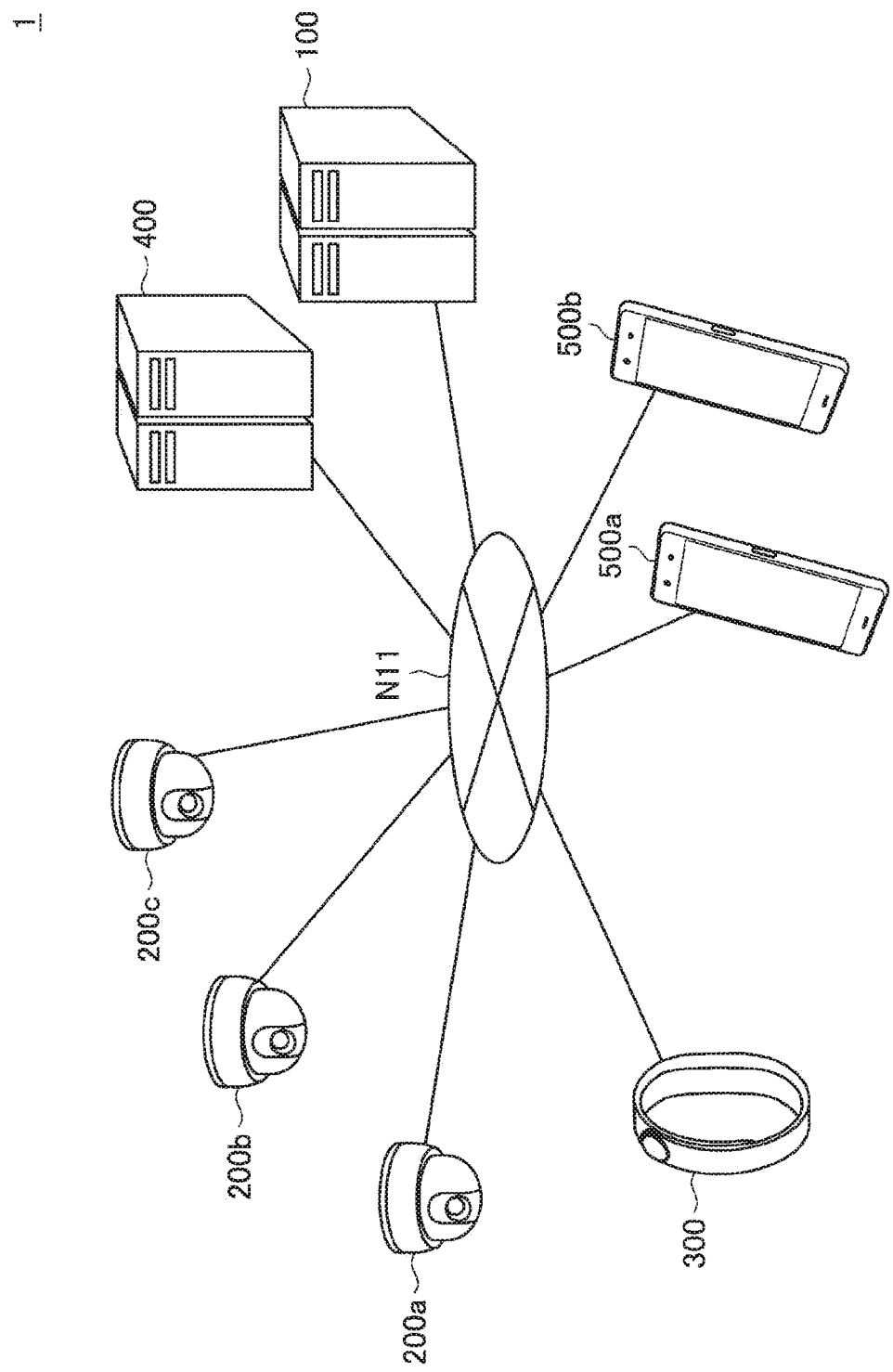
FIG. 1 is a diagram illustrating an example of a schematic system configuration of an information processing system according to an embodiment of the present disclosure.

Hereinafter, exemplary embodiments of the present disclosure will be described in detail with reference to the appended drawings. Incidentally, in this specification and the drawings, components having substantially the same functional configuration will be assigned the same reference numerals, and repeated description will be omitted.

Incidentally, the description will proceed in the following order.

1. Schematic configuration
2. First Embodiment
2.1. Overview
2.2. Functional configuration
2.3. Process
2.4. Evaluation
3. Second Embodiment
3.1. Overview
3.2. Functional configuration
3.3. Process
3.4. Evaluation
4. Third Embodiment
4.1. Overview
4.2. Process
4.3. Example
4.4. Evaluation
5. Fourth Embodiment
5.1. Overview
5.2. Functional configuration
5.3. Process
5.4. Example
5.5. Evaluation
6. Other application examples
6.1. First application example: alliance with network service
6.2. Second application example: extraction of recording result of audio data
6.3. Third application example: specifying of moving line of user
6.4. Fourth application example: example of system configuration
7. Hardware configuration
8. Conclusion

1. SCHEMATIC CONFIGURATION

First, an example of a schematic system configuration of an information processing system according to one embodiment of the present disclosure will be described with reference to FIG. 1. FIG. 1 is a diagram illustrating an example of a schematic system configuration of an information processing system according to an embodiment of the present disclosure.

An information processing system 1 according to the present embodiment includes a matching server 100, a plurality of imaging devices 200, a terminal device 300, and an image collecting server 400 as illustrated in FIG. 1. The matching server 100, a plurality of imaging devices 200, the terminal device 300, and the image collecting server 400 are connected so that they can perform transmission and reception of information with one another via a predetermined network N11.

Incidentally, if the information processing system 1 includes a plurality of imaging devices 200, the number of imaging devices 200 is not particularly limited. For example, in the example illustrated in FIG. 1, the information processing system 1 includes imaging devices 200a to 200c as a plurality of imaging devices 200.

Further, the type of the network N11 is not particularly limited. As a specific example, the network N11 may be constituted by a so-called wireless network such as a network based on a Wi-Fi (registered trademark) standard. Further, as another example, the network N11 may be constituted by the Internet, a dedicated line, a local area network (LAN), a wide area network (WAN), or the like. Further, the network N11 may include a plurality of networks, and at least a part thereof may be configured as a wired network.

Further, the information processing system 1 may include one or more output devices 500. For example, in the example illustrated in FIG. 1, the information processing system 1 includes output devices 500a and 500b as one or more output devices 500. Incidentally, the terminal device 300 may also undertake the output device 500.

The imaging device 200 is configured to be capable of capturing an image such as a still image or a moving image. In the information processing system 1 according to the present embodiment, at least some imaging devices 200 among a plurality of imaging devices 200 may be configured as an imaging device which is steadily installed at a predetermined position and captures an image of a predetermined area, for example, like a so-called environmental camera or the like. Further, in the information processing system 1 according to the present embodiment, at least some imaging devices 200 among a plurality of imaging devices 200 may be configured as a digital still camera or a digital video camera owned by an individual. Incidentally, in the following description, an area in a space of the real world imaged as an image by the imaging device 200 is also referred to as an "imaging area." Incidentally, in the following description, the space of the real world is also referred to as a "real space."

Further, the imaging device 200 is configured to be able to communicate with other devices via a wired or wireless communication path (for example, at least a part of the network N11). On the basis of the above configuration, the imaging device 200 transmits the captured image to the image collecting server 400 via the network N11. As described above, for example, images captured by a plurality of imaging devices 200a to 200c are sequentially transmitted to the image collecting server 400, and stored in a storage area of the image collecting server 400.

The image collecting server 400 acquires an image captured by the imaging device 200 from each of a plurality of imaging devices 200 connected via the network N11. The image collecting server 400 has a storage area for temporarily or permanently storing various types of data and stores the image acquired from each imaging device 200 in the storage area. Further, the image collecting server 400 transmits at least some of the images stored in the storage area to the matching server 100 via the network N11 on the basis of an instruction from the matching server 100.

The terminal device 300 is a portable information processing device such as a so-called smartphone or a tablet terminal and is configured to be able to communicate with other devices via a wireless communication path (for example, at least a part of the network N11). Further, the terminal device 300 may be configured to be worn on a part of the body of the user (for example, an arm or the like) like a so-called wearable terminal. Incidentally, in the present disclosure, a case where the terminal device 300 is described as being "held" is assumed to include a case where the user wears the terminal device 300 on a part of the user, or a case where the user carries the terminal device 300, a case where the user grips the terminal device 300, and the like.

In the information processing system 1 according to the present embodiment, the matching server 100 to be described later specifies a target imaged as a subject from among images captured by a plurality of imaging devices 200 by setting the user holding the terminal device 300 as the target.

Specifically, the terminal device 300 transmits information indicating a predetermined feature quantity used for the matching server 100 to identify the terminal device 300. Incidentally, an example of the information indicating the feature quantity will be described later separately. Further, the terminal device 300 may acquire position information of the terminal device 300 (eventually, the user holding the terminal device 300) by a global navigation satellite system (GNSS) or the like and notify the matching server 100 of the acquired position information. Further, the terminal device 300 may include a timepiece unit and may associate time information acquired by the timepiece unit with the position information when notifying the matching server 100 of the acquired position information. On the basis of such a configuration, for example, the terminal device 300 may associate the time information in which the position information is acquired with the position information acquired by the GNSS or the like. Accordingly, the matching server 100 can recognize, for example, a position (that is, when and where the target stays) of the terminal device 300 of each time.

The matching server 100 makes an attempt to specify the target holding the terminal device 300 imaged as the subject from among the images accumulated in the image collecting server 400 (that is, the images captured by a plurality of imaging devices 200) on the basis of the information indicating the predetermined feature quantity transmitted from the terminal device 300.

As a specific example, the terminal device 300 may include a detection unit that detects a motion of the body of the user holding the terminal device 300 such as an acceleration sensor or angular velocity sensor and may transmit information corresponding to a detection result of the motion of the body to the matching server 100 as the information indicating the feature quantity. In this case, the matching server 100 performs image analysis on each image and specifies a subject of which at least some motions substantially coincide with the motion of the body of the user indicated by the information transmitted from the terminal device 300 from among the subjects imaged in the images as the target holding the terminal device 300.

Further, as another example, the terminal device 300 may cause a light emitting unit to emit light with a predetermined light emission pattern and may transmit the optical signal corresponding to the light emission pattern to the outside as the information indicating the feature quantity. In this case, the matching server 100 performs image analysis on each image and specifies a light emitter emitting light with a predetermined light emission pattern from the image. Incidentally, in this case, since the light emitter emitting light with a predetermined light emission pattern may correspond to the light emitting unit of the terminal device 300, it is possible to specify the target holding the terminal device 300 on the basis of the specifying result of the light emitter from the image. Further, a type of optical signal is not particularly limited as long as the optical signal can be specified from the image. As a specific example, the optical signal may be an optical signal of a visible light wavelength band or may be an infrared signal.

Further, the matching server 100 may recognize the position of the target holding the terminal device 300 and extract (limit) an image in which the target is likely to be imaged as the subject from among the images accumulated in the image collecting server 400. As a specific example, the matching server 100 may specify the imaging device 200 which is likely to include the target holding the terminal device 300 in the angle of view on the basis of the position information notified from the terminal device 300 and extract the image captured by the imaging device 200. Incidentally, in this case, the method is not particularly limited as long as an installation position or an angle of view of each imaging device 200 can be recognized. As a specific example, the matching server 100 may hold in advance information related to the imaging device 200 such as the installation position or the angle of view of each imaging device 200. Further, as another example, a predetermined server or the like may manage the information related to each imaging device 200 using a database or the like. In this case, the matching server 100 may obtain the information related to the corresponding imaging device 200 from the server using the position information notified from the terminal device 300 as a search condition. Accordingly, the matching server 100 can limit an image which is to undergo a process related to specifying of a predetermined target from an image to the images captured by the imaging device 200 among the images accumulated in the image collecting server 400.

Further, the matching server 100 may recognize the position of the target holding the terminal device 300 every hour and further narrow down an image in which the target is likely to be imaged as the subject from among the images accumulated in the image collecting server 400. As a specific example, the matching server 100 may specify a time zone in which the target is likely to be included in the angle of view of the imaging device 200 corresponding to the position information on the basis of the time information associated with the position information notified from the terminal device 300. In this case, the matching server 100 may extract the image captured in the time zone by the imaging device 200 from among the images accumulated in the image collecting server 400. Accordingly, the matching server 100 can limit an image which is to undergo a process related to specifying of a predetermined target from an image to the images captured in the time zone by the imaging device 200 among the images accumulated in the image collecting server 400.

As described above, the matching server 100 specifies the target holding the terminal device 300 imaged as the subject in the image from among at least some of the images accumulated in the image collecting server 400. Then, the matching server 100 presents information related to the target to a predetermined output destination using the specifying result of the target.

As a specific example, the image in which the target is imaged is extracted in accordance with the specifying result of the predetermined target from among the images accumulated in the image collecting server 400. To this end, for example, the matching server 100 may transmit the extracted image (that is, the image in which the predetermined target is imaged) to the predetermined output device 500 via the network N11 as the information related to the predetermined target. Further, the matching server 100 may cause the extracted image to be output to a predetermined output device such as a display as the information related to the predetermined target. Further, an entity that directly executes transmission or output of the extracted image may be the image collecting server 400. In this case, the matching server 100 may instruct the image collecting server 400 to transmit or output the extracted image.

Incidentally, an example of a process in which the matching server 100 presents the information related to the target using the specifying result of the target will be described later separately in detail with a specific example.

Further, in the following description, in a case where information is described as being "present," it is assumed to include causing a predetermined output device to output the information or transmitting the information to a predetermined transmission destination as described above. Incidentally, in a case where information is transmitted, a transmission destination of the information is not limited to only an information processing device such as a server or the like, and the transmission destination of the information (that is, an information presentation destination) is assumed to include, for example, a network service such as a social media or the like.

The output device 500 corresponds to a device for presenting various types of information to the user, and can be constituted by, for example, a smartphone, a tablet terminal, a personal computer (PC) or the like. Incidentally, the terminal device 300 may double as the output device 500 as described above. In this case, it is desirable to install an output unit that outputs information such as a display in the terminal device 300.

Incidentally, the system configuration of the information processing system 1 according to the present embodiment described above is merely an example, and the present invention is not limited to the example described above with reference to FIG. 1. As a specific example, the matching server 100 and the image collecting server 400 may be integrally configured. Further, some components of the matching server 100 may be installed in other devices. As a specific example, a component corresponding to an analysis processing unit 103 may be installed in the image collecting server 400 side. Further, the matching server 100 and the image collecting server 400 may be constituted by a plurality of devices operating in coordination with each other.

The example of the schematic system configuration of the information processing system according to one embodiment of the present disclosure has been described above with reference to FIG. 1. Incidentally, more specific examples of a configuration and a process of the information processing system according to the present disclosure will be described below separately as embodiments.

2. FIRST EMBODIMENT 2.1. Overview

Figure 2:
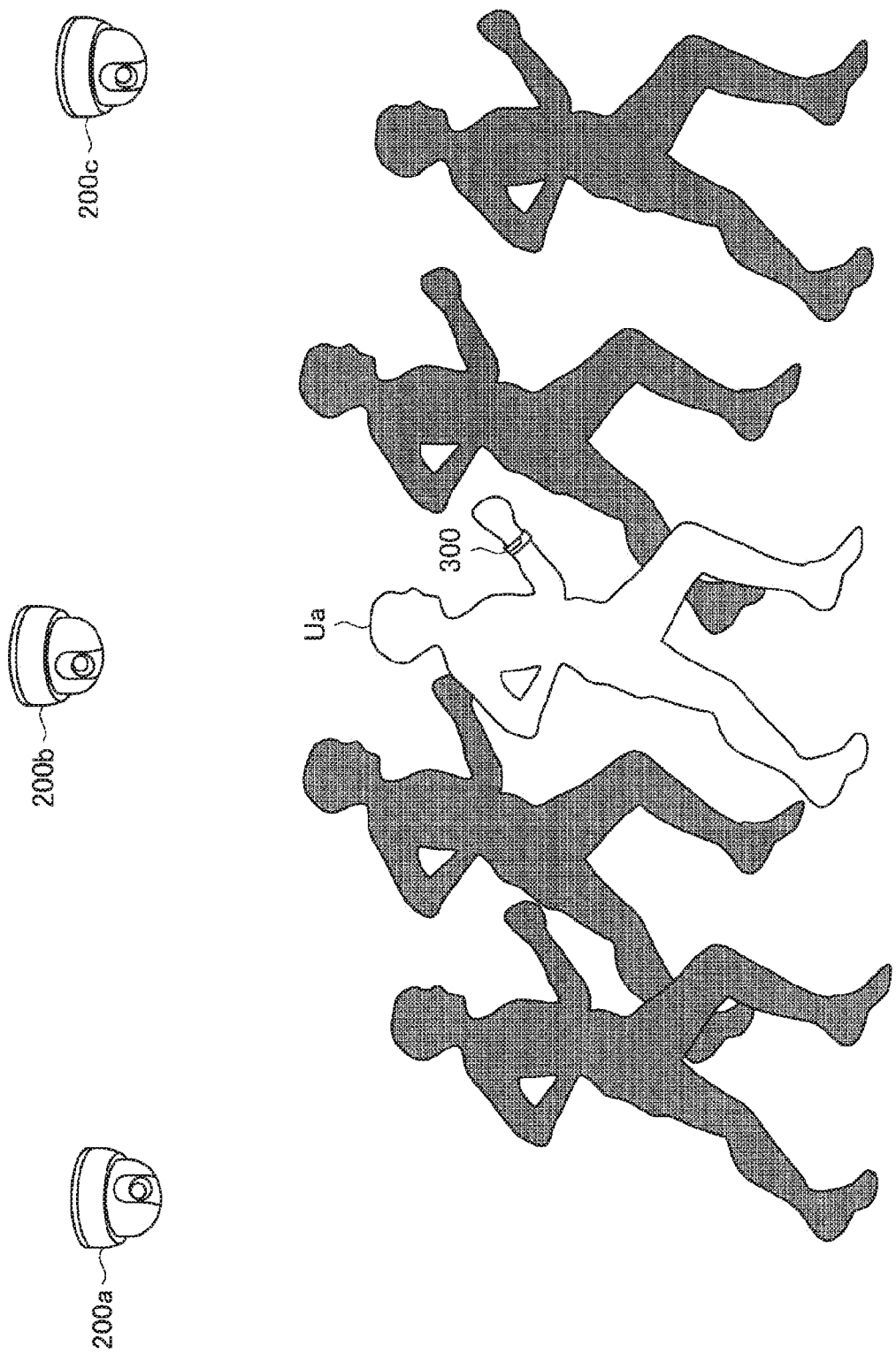
FIG. 2 is an explanatory diagram for describing an overview of an information processing system according to a first embodiment of the present disclosure.

First, a first embodiment of the present disclosure will be described. For example, FIG. 2 is an explanatory diagram for describing an overview of the information processing system 1 according to the present embodiment. In the present embodiment, an example of a mechanism for realizing a service of specifying an image in which a predetermined target is imaged from among images randomly captured by an imaging device steadily installed at a predetermined position such as a so-called environmental camera and providing the specified image will be described.

For example, FIG. 2 illustrates an example in which a situation of a sports event is imaged by the imaging devices 200a to 200c (for example, environmental cameras) installed in various places. In this case, each of the imaging devices 200a to 200c sequentially and randomly captures an image of a predetermined area (for example, a moving image) chronologically and stores the captured image in a predetermined storage area (for example, the image collecting server 400). With such a configuration, for example, if a user Ua holding the terminal device 300 falls into the angle of view of each of the imaging devices 200a to 200c (that is, the imaging area), the user Ua is shown in an image captured at that timing as the subject.

In this regard, the information processing system 1 according to the present embodiment specifies the image in which the user Ua holding the terminal device 300 is shown among the images captured by the imaging devices 200a to 200c and presents the specified image to a predetermined output destination. Further, at this time, the information processing system 1 may clip an area in which the user Ua is shown from the specified image as a partial image and provide the partial image.

With the above configuration, an image in which a specific target is imaged is clipped from among the images sequentially captured by the imaging device 200 (for example, the environmental camera or the like) installed at each location, and the clipped image can be also provided as a live image.

The overview of the information processing system according to the present embodiment has been described above with reference to FIG. 2. Incidentally, an example of a configuration and a process of the information processing system according to the present embodiment will be described below in more detail.

2.2. Functional Configuration

Figure 3:
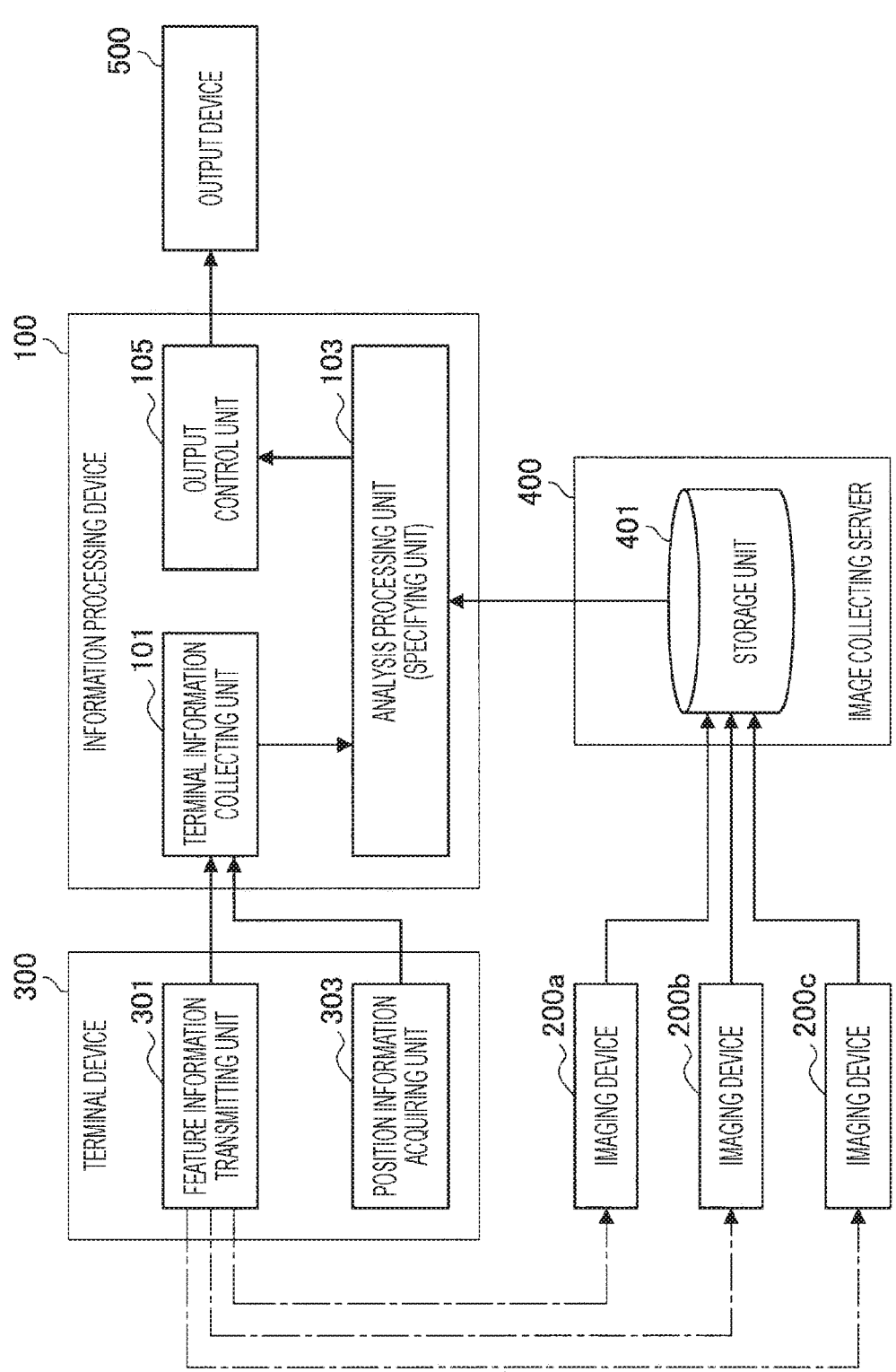
FIG. 3 is a block diagram illustrating an example of a functional configuration of an information processing system according to the embodiment.

Next, an example of a functional configuration of the information processing system 1 according to the present embodiment will be described with reference to FIG. 3. FIG. 3 is a block diagram illustrating an example of a functional configuration of the information processing system 1 according to the present embodiment.

The information processing system 1 according to the present embodiment includes a matching server 100, a plurality of imaging devices 200 (for example, imaging devices 200a to 200c), a terminal device 300, and an image collecting server 400, and an output device 500 as illustrated in FIG. 3. Incidentally, the matching server 100, a plurality of imaging devices 200a to 200c, the terminal device 300, the image collecting server 400, and the output device 500 correspond to the matching server 100, a plurality of imaging devices 200a to 200c, the terminal device 300, the image collecting server 400, and the output device 500a or 500b in FIG. 1, respectively. Further, in the example illustrated in FIG. 3, in order to facilitate understanding of the functional configuration of the information processing system 1, illustration of a component corresponding to a communication unit for performing transmission and reception of information between respective devices is omitted. Therefore, for example, in a case where various types of information are transmitted and received between different devices, transmission and reception of information are assumed to be performed via a component corresponding to the communication unit unless otherwise specified.

First, the configuration of the terminal device 300 will be described. The terminal device 300 includes a feature information transmitting unit 301 and a position information acquiring unit 303 as illustrated in FIG. 3.

The feature information transmitting unit 301 transmits information indicating a predetermined feature quantity to the outside. Incidentally, as described above, the information related to the feature quantity is used for the matching server 100 to specify a predetermined target holding the terminal device 300 (for example, the user Ua illustrated in FIG. 2) from the images captured by the imaging devices 200a to 200c. Further, information which is actualized directly or indirectly as a video in an image captured by the imaging device 200 is desirable as the information indicating the feature quantity.

As a specific example, as described above, the feature information transmitting unit 301 may transmit a detection result of a motion of the terminal device 300 detected by a detecting unit (not illustrated) such as an acceleration sensor or an angular velocity sensor (eventually, the motion of the target holding the terminal device 300) to the matching server 100 as the information indicating the feature quantity. In general, actions of individuals are different except in special situations in which a plurality of targets performs the same action such as a march or a mass game. Therefore, for example, it is possible to specify the target holding the terminal device 300 by specifying a subject of which at least some motions substantially coincide with the motion of the terminal device 300 detected by the detecting unit from among the subjects in the images captured by the imaging device 200.

Further, as another example, as described above, the feature information transmitting unit 301 may cause a light emitting unit (not illustrated) or the like to emit light with a predetermined light emission pattern and transmit an optical signal corresponding to the light emission pattern to the outside as the information indicating the feature quantity.

Figure 4:
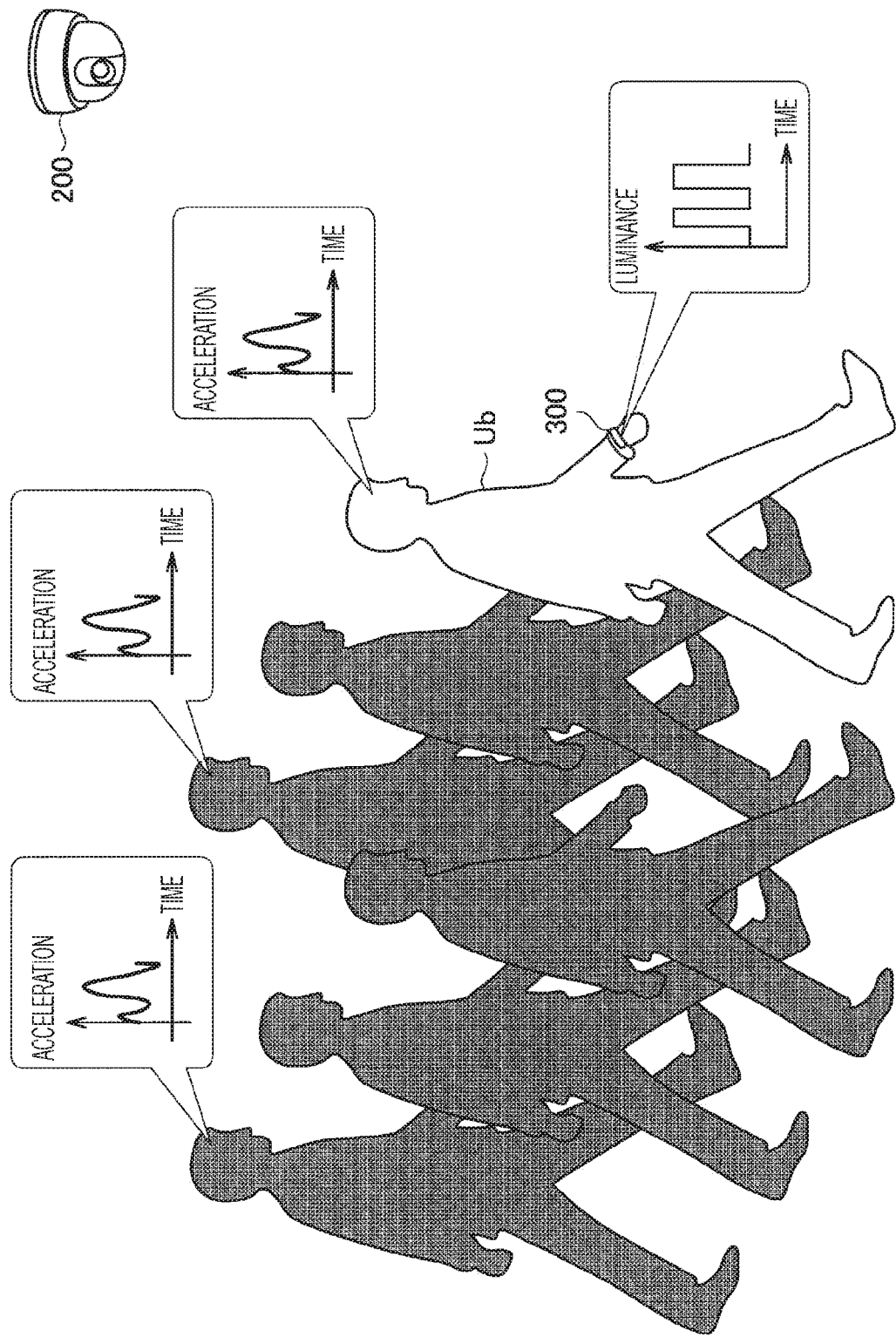
FIG. 4 is an explanatory diagram for describing an overview of one aspect of an information processing system according to the embodiment.

For example, FIG. 4 is an explanatory view for describing an overview of one aspect of the information processing system 1 according to the present embodiment, and illustrates an example in which an optical signal corresponding to a predetermined light emission pattern is transmitted as the information indicating the feature quantity. Specifically, FIG. 4 illustrates an example in which a crowd performs the same motion as in a marching scene. In this case, since there are many other persons who perform a motion similar to a user Ub, for example, even if the motion of the user Ub is detected by a detection unit such as an acceleration sensor, it is difficult to specify the user Ub from the image captured by the imaging device 200 on the basis of the detection result.

On the other hand, as illustrated in FIG. 4, the terminal device 300 causes the light emitting unit to emit light with a predetermined light emission pattern (that is, transmits the optical signal to the outside), so that the light emitting unit is shown in the image captured by the imaging device 200 as the light emitter that emits light with the light emission pattern. The light emission pattern of the optical signal is emitted independently without being affected by the motion of the user. Therefore, as illustrated in FIG. 4, even in a case where the crowd shown in the image perform the same motion, it is possible to detect the light emitter emitting light with a predetermined light emission pattern from the image and specify the user Ub holding the terminal device 300 from the image. Incidentally, in this case, the feature information transmitting unit 301 may separately notify the matching server 100 of information used for the matching server 100 to recognize the light emission pattern.

Incidentally, the above-described example is merely an example, and the type of information indicating the feature quantity is not particularly limited as long as the information is actualized directly or indirectly as a video in the image captured by the imaging device 200. As a specific example, a pattern such as a specific design or pattern may be presented on a screen of an output unit such as a display in a visually recognizable form. In such a case, it is possible to specify a predetermined target imaged in the image by detecting the pattern from the image. Further, the type of information indicating the feature quantity may be changed appropriately in accordance with a type of image in which the information is specified (for example, either a moving image or a still image). Specifically, in a case where a predetermined target is specified from a still image, it is desirable that the information indicating the feature quantity be information which can be identified from the still image (for example, a pattern such as a design or a pattern).

The position information acquiring unit 303 acquires information related to the position of the terminal device 300 (eventually, the position of the target holding the terminal device 300). As a specific example, the position information acquiring unit 303 may specify the position of the terminal device 300 using the GNSS or the like. Incidentally, a method thereof is not particularly limited as long as the position of the terminal device 300 can be specified. As a specific example, the position information acquiring unit 303 may specify the position of the terminal device 300 on the basis of a result of communication with a communication device installed at a predetermined point such as a base station device or an access point.

Then, the position information acquiring unit 303 transmits the information related to the position (for example, position information indicating the position of the terminal device 300) to the matching server 100 in accordance with the specifying result of the position of the terminal device 300. Incidentally, at this time, the position information acquiring unit 303 may associate time information indicating a time at which the position is specified with the information related to the position. Accordingly, it is possible to specify the position of the terminal device 300 of each time even in a situation in which the position of the terminal device 300 changes sequentially.

Next, the imaging device 200 and the image collecting server 400 will be described. The image collecting server 400 includes a storage unit 401 as illustrated in FIG. 3. The storage unit 401 is a storage area that temporarily or permanently stores various types of data.

The images captured by the imaging devices 200*a* to 200*c* are sequentially transmitted to the image collecting server 400 and stored in the storage unit 401. At this time, the images stored in the storage unit 401 may be associated with information (for example, identification information, an installation position, information indicating an angle of view, or the like) specifying the imaging device 200 which is an imaging source of the image. Further, the images stored in the storage unit 401 may be associated with information indicating a time (for example, a date and time or the like) at which the image is captured. Incidentally, an entity that associates the information with each image is not particularly limited. As a specific example, the imaging device 200 which is an imaging source of an image may associate the image with information specifying the imaging device 200, information indicating a time at which the image is captured, or the like. Further, as another example, the image collecting server 400 may associate information or the like specifying the imaging device 200 with the images sequentially transmitted from the respective imaging devices 200. Accordingly, the images sequentially captured by the imaging devices 200*a* to 200*c* are accumulated in the storage unit 401.

Incidentally, for example, the images accumulated in the storage unit 401 may be transmitted to the matching server 100 via the network N11 on the basis of an instruction from the matching server 100. Further, at this time, only an image matching a condition designated from the matching server 100 among the images stored in the storage unit 401 may be extracted and transmitted to the matching server 100 in accordance with the condition. For example, in a case where a condition regarding the imaging device 200 which is the imaging source of the image or a condition regarding the time zone in which the image is captured is designated from the matching server 100, the image corresponding to the condition is transmitted to the matching server 100.

Next, a configuration of the matching server 100 will be described. The matching server 100 includes a terminal information collecting unit 101, an analysis processing unit 103, and an output control unit 105 as illustrated in FIG. 3.

The terminal information collecting unit 101 collects information transmitted from a predetermined terminal device 300. For example, in a case where the information indicating the predetermined feature quantity is directly transmitted from the terminal device 300 to the matching server 100, the terminal information collecting unit 101 acquires the information indicating the feature quantity from the terminal device 300. Further, the terminal information collecting unit 101 may acquire the information related to the position of the terminal device 300 from the terminal device 300. Further, at this time, the terminal information collecting unit 101 may acquire time information indicating a time at which the information related to the position is acquired as the information associated with the information related to the position of the terminal device 300. Then, the terminal information collecting unit 101 outputs the information collected from the terminal device 300 to the analysis processing unit 103.

The analysis processing unit 103 specifies the target holding the terminal device 300 (for example, the user of terminal device 300) from among at least some of the images accumulated in the storage unit 401 of the image collecting server 400 in accordance with the information indicating the feature quantity transmitted from the terminal device 300.

Specifically, the analysis processing unit 103 may acquire the information related to the position of the terminal device 300 from the terminal information collecting unit 101 and specify the imaging device 200 which is likely to capture the image of the target holding the terminal device 300 in accordance with the information. More specifically, for example, the analysis processing unit 103 acquires the information indicating the installation position of each of the plurality of imaging devices 200 and recognizes a position or a range in which the imaging device 200 falls within the angle of view. Incidentally, the method of acquiring the information related to the imaging device 200 such as the installation position or the angle of view of each imaging device 200 is not particularly limited as described above. Further, it is desirable for the analysis processing unit 103 to collate the position or the range in which each imaging device 200 falls within the angle of view with the position of the terminal device 300 and specify the imaging device 200 which is likely to capture the image of the target holding the terminal device 300. Further, at this time, in a case where the time information is associated with the information related to the position of the terminal device 300, the analysis processing unit 103 may specify a time zone in which the image of the target is likely to be captured in accordance with the time information.

Then, the analysis processing unit 103 acquires an image in which the target is likely to be captured from the image collecting server 400. For example, the analysis processing unit 103 may acquire the image captured by the imaging device 200 from the image collecting server 400 in accordance with the specifying result of the imaging device 200 based on the information related to the position of the terminal device 300. Further, at this time, the analysis processing unit 103 may acquire the image captured at the time indicated by the time information by the imaging device 200 from the image collecting server 400 in accordance with the time information associated with the information related to the position of the terminal device 300.

Next, from the image acquired from the image collecting server 400, the analysis processing unit 103 specifies the target holding the terminal device 300 imaged in the image in accordance with the information indicating the feature quantity transmitted from the terminal device 300. Incidentally, the method of specifying the target from the image has been described above.

As described above, the analysis processing unit 103 can specify the image in which the target holding the terminal device 300 is imaged among the images stored in the storage unit 401 of the image collecting server 400 (that is, the images captured by a plurality of imaging devices 200). Further, it will be appreciated that the analysis processing unit 103 is able to specify the target imaged in the image in accordance with the above process. Incidentally, the analysis processing unit 103 corresponds to an example of a "specifying unit."

Then, the analysis processing unit 103 outputs, to the output control unit 105, the information corresponding to the specifying result of the target from the image acquired from the image collecting server 400 as the information related to the target. As a specific example, the analysis processing unit 103 may output the image in which the target is imaged among the images acquired from the image collecting server 400 to the output control unit 105 as the information related to the target. Further, as another example, the analysis processing unit 103 may perform image analysis on the image in which a predetermined target is imaged, extract information related to the target (for example, a state of the target or information such as an external appearance of the target) from the image, and output an extraction result to the output control unit 105.

The output control unit 105 acquires the information related to the predetermined target (that is, the target holding the terminal device 300) from the analysis processing unit 103 and presents the acquired information to a predetermined output destination. As a specific example, the output control unit 105 may acquire an image in which a predetermined target is imaged as the information related to the target and transmit the image to the predetermined output device 500. Accordingly, a user of the output device 500 (for example, a related person of the target) refers to the image, in which the target is imaged, extracted from among the images captured by a plurality of imaging devices 200a to 200c through the output device 500.

Incidentally, as described above, a counterpart to which the output control unit 105 presents the information related to the predetermined target is not necessarily limited to only the output device 500. For example, the output control unit 105 may transmit the information related to the target (for example, the image in which the target is imaged) to a server that delivers an image such as a moving image or a still image (for example, a server such as a social media, a video/photo sharing site, or the like). Further, as another example, the output control unit 105 may cause a predetermined output device such as a display to output the information related to the target.

The example of the functional configuration of the information processing system 1 according to the present embodiment has been described with reference to FIGS. 3 and 4.

2.3. Process

Figure 5:
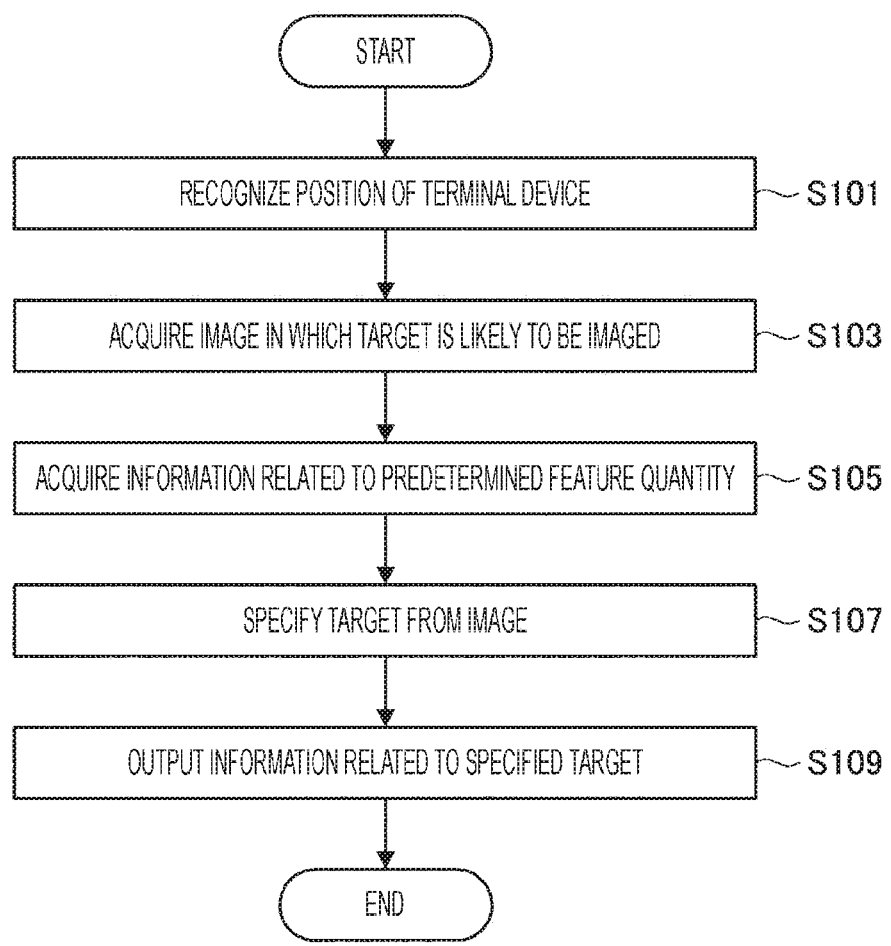
FIG. 5 is a flowchart illustrating an example of a flow of a series of processes of an information processing system according to the embodiment.

Next, an example of a flow of a series of processes of the information processing system 1 according to the present embodiment will be described with reference to FIG. 5, particularly focusing on an operation of the matching server 100. FIG. 5 is a flowchart illustrating an example of a flow of a series of processes of the information processing system 1 according to the present embodiment.

As illustrated in FIG. 5, the matching server 100 (the terminal information collecting unit 101) acquires the information related to the position of the terminal device 300 from the predetermined terminal device 300. Further, at this time, the matching server 100 may acquire the time information indicating the time at which the information related to the position is acquired as the information associated with the information related to the position of the terminal device 300. Accordingly, the matching server 100 can recognize the position of the terminal device 300 (eventually, the position of the target holding the terminal device 300) (S101).

Next, the matching server 100 (the analysis processing unit 103) specifies the imaging device 200 which is likely to capture the image of the target holding the terminal device 300 in accordance with the information acquired from the terminal device 300. Then, the matching server 100 acquires the image in which the target is likely to be imaged, that is, the image captured by the specified imaging device 200 from the image collecting server 400. Further, at this time, the matching server 100 may specify a time zone in which the image of the target is likely to be captured by the imaging device 200 in accordance with the time information acquired together. In this case, the matching server 100 may limit the image acquired from the image collecting server 400 to the images captured in the specified time zone (S103).

Further, the matching server 100 (the analysis processing unit 103) acquires the information related to the predetermined feature quantity transmitted from the terminal device 300 described above. For example, the matching server 100 may acquire information indicating a detection result of a motion of the terminal device 300 (eventually, a motion of the target holding the terminal device 300) by a detecting unit such as an acceleration sensor or an angular velocity sensor as the information related to the feature quantity from the terminal device 300 (S105).

Then, the matching server 100 (the analysis processing unit 103) makes an attempt to specify the target among the subjects imaged in at least some of the images acquired from the image collecting server 400 on the basis of the acquired information related to the feature quantity. As a specific example, the matching server 100 may perform image analysis on each image and specify a subject of which at least some motions substantially coincide with the motion of the target indicated by the information acquired from the terminal device 300 from among the subjects imaged in the images as the target holding the terminal device 300 (S107).

Then, the matching server 100 (the output control unit 105) presents the information related to the target to a predetermined output destination on the basis of the specifying result of the target from the acquired image. For example, the matching server 100 may transmit the image in which the target is imaged among the images acquired from the image collecting server 400 to a predetermined output device 500 as the information related to the target (S109).

The example of the flow of a series of processes of the information processing system 1 according to the present embodiment has been described above with reference to FIG. 5, particularly focusing on an operation of the matching server 100.

2.4. Evaluation

As described above, in the information processing system 1 according to the present embodiment, the matching server 100 acquires the image in which the target holding the terminal device 300 is likely to be imaged among the images captured by a plurality of imaging devices 200 in accordance with the information related to the position of the terminal device 300 (eventually, the position of the target holding the terminal device 300). Further, the matching server 100 makes an attempt to specify the target holding the terminal device 300 from at least some of the acquired images on the basis of the information indicating the predetermined feature quantity transmitted from the terminal device 300. Then, the matching server 100 presents the information related to the target to a predetermined output destination on the basis of the specifying result of the target from the image.

With the above configuration, it is also possible to realize a service of specifying an image in which a predetermined target (that is, the target holding the terminal device 300) is imaged from among the images randomly captured by the imaging device 200 steadily installed at a predetermined position such as an environmental camera and providing the image.

Further, according to the information processing system 1 of the present embodiment, it is possible to specify the position in the image in which the predetermined target is imaged, and thus, for example, it is possible to clip a portion in which the target is imaged as a partial image and present the partial image to a predetermined output destination. In particular, the environmental cameras or the like are often installed at a plurality of locations. Therefore, according to the information processing system 1 of the present embodiment, for example, it is possible to automatically generate a multi-angle image in which a predetermined target is imaged in a plurality of directions on the basis of the images captured by a plurality of imaging devices 200.

Further, according to the information processing system 1 of the present embodiment, it is also possible to specify the time at which the target is imaged by each imaging device 200. Therefore, for example, the image of the target captured at a timing at which the moving target falls within the angle of view of each of a plurality of imaging devices 200 installed at different places can be automatically extracted chronologically.

Further, the matching server 100 may acquire the information related to the position of the terminal device 300 in real time and sequentially monitor the position of the target holding the terminal device 300. With such a configuration, for example, the matching server 100 can specify the image in which a predetermined target is imaged from among the images sequentially captured by the imaging devices 200 in real time and present the image to a predetermined output as a live image.

Incidentally, according to the information processing system 1 of the present embodiment, it is possible to cause the terminal device 300 to acquire the information related to a predetermined feature quantity using a passive sensor with relatively low power consumption such as an acceleration sensor. Therefore, it is also possible to further suppress an increase in power consumption of the terminal device 300 when the information processing system 1 according to the present embodiment is implemented.

Further, even in a case where the terminal device 300 transmits the information related to a predetermined feature quantity as an optical signal of a predetermined light emission pattern, it is possible to further suppress the power consumption of the terminal device 300 by limiting the transmission opportunities of the optical signal. Incidentally, the transmission opportunities of the optical signal may be selectively switched by a predetermined operation by the target (user) holding the terminal device 300. Further, as another example, the terminal device 300 may selectively switch whether or not the optical signal is transmitted in accordance with a detection result of a predetermined state or situation. For example, the terminal device 300 may transmit an optical signal in a case where it is detected that it enters the imaging area of each imaging device 200. Further, as another example, the terminal device 300 may transmit an optical signal on the basis of an instruction from the matching server 100. As a specific example, the terminal device 300 may transmit an optical signal in a case where a notification indicating that it is difficult to specify the target based on a predetermined feature quantity is received from the matching server 100.

3. SECOND EMBODIMENT

3.1. Overview

Next, a second embodiment of the present disclosure will be described. In the first embodiment described above, the matching server 100 specifies the imaging device 200 which is likely to capture the image of the target holding the terminal device 300 (eventually, the image in which the target is likely to imaged) in accordance with the information related to the position of the terminal device 300 specified by the GNSS or the like. On the other hand, in the present embodiment, an example of a configuration in which, in a case where the terminal device 300 does not have the function of specifying its own position, the image in which the target holding the terminal device 300 is imaged is specified from among the images captured by a plurality of imaging devices 200 will be described.

Figure 6:
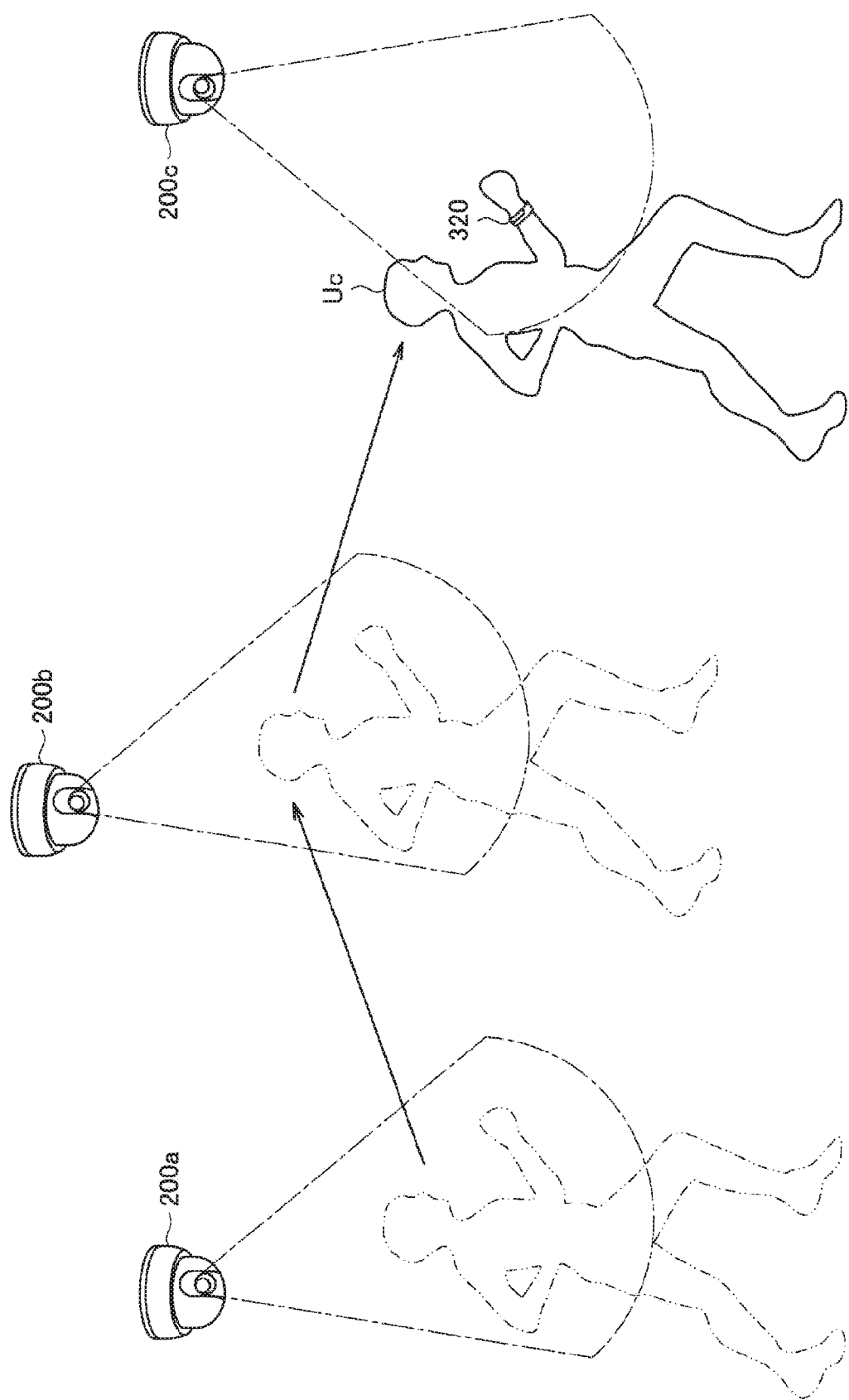
FIG. 6 is an explanatory diagram for describing an overview of an information processing system according to a second embodiment of the present disclosure.

For example, FIG. 6 is an explanatory diagram for describing an overview of an information processing system according to the present embodiment. Incidentally, in the present description, the information processing system according to the present embodiment is also referred to as an "information processing system 2" in order to distinguish it from the information processing system according to the other embodiments described above. Similarly, a terminal device and a matching server according to the present embodiment are also referred to as a "terminal device 320" and a "matching server 120."

Specifically, FIG. 6 illustrates an example of specifying an image of a user Uc who is running from among the images imaged by the imaging devices 200a to 200c (for example, the environmental cameras) installed at various places. In this case, each of the imaging devices 200a to 200c sequentially and randomly captures an image of a predetermined area (for example, a moving image) chronologically and stores the captured image in a predetermined storage area (for example, the image collecting server 400). In other words, in a case where the user Uc holding the terminal device 320 falls into the angle of view of each of the imaging devices 200a to 200c (that is, the imaging area), the user Uc is shown in the image captured at that timing as the subject.

Further, in the information processing system 2 according to the present embodiment, each imaging device 200 transmits a predetermined signal (for example, an infrared signal or the like) corresponding to information specifying itself to its surroundings (in particular, its own imaging area). Further, the terminal device 320 includes a receiving unit that receives the signal transmitted from each imaging device 200. Under such a configuration, for example, if the user Uc holding the terminal device 320 enters the imaging area of the imaging device 200, the signal transmitted from the imaging device 200 is received by the terminal device 320, and a reception result of the signal is recorded by the terminal device 320. Incidentally, at this time, the terminal device 320 may store the reception result of the signal transmitted from the imaging device 200 in association with time information (for example, a time stamp) indicating a time at which the signal is received.

For example, as illustrated in FIG. 6, in a case where the user Uc holding the terminal device 320 sequentially enters the imaging range of the imaging devices 200a, 200b and 200c, the signals transmitted from the imaging devices 200a to 200c are sequentially recorded by the terminal device 320.

Under such a configuration, in the information processing system 2 according to the present embodiment, the image in which the target holding the terminal device 320 is imaged is specified from the images captured by the plurality of imaging devices 200a to 200c using the information (that is, the reception results of the signals transmitted from the respective imaging devices 200) recorded by the terminal device 320. With such a configuration, according to the information processing system 2 of the present embodiment, it becomes possible to specify the image in which the target holding the terminal device 320 is imaged even in a case where the terminal device 320 does not have the function of detecting the position of the terminal device 320 such as the GNSS or the like.

Incidentally, in the information processing system. 2 according to the present embodiment, it is desirable for the terminal device 320 to be held at a position at which the signal transmitted from the imaging device 200 can be easily received in a case where the target holding the terminal device 320 enters the imaging area of each imaging device 200. In other words, the form of the terminal device 320 may be changed appropriately in accordance with a type of signal transmitted from each imaging device 200, an assumed installation position of each imaging device 200, or the like. For example, in a case where a situation in which an infrared signal is transmitted from the imaging device 200 installed at a high place is assumed, the terminal device 320 may be configured as a wearable terminal which can be worn on the head of the user so that the infrared signal can be more easily received.

The overview of the information processing system according to the present embodiment has been described above with reference to FIG. 6. Incidentally, an example of a configuration and a process of the information processing system according to the present embodiment will be described below in more detail.

3.2. Functional Configuration

Figure 7:
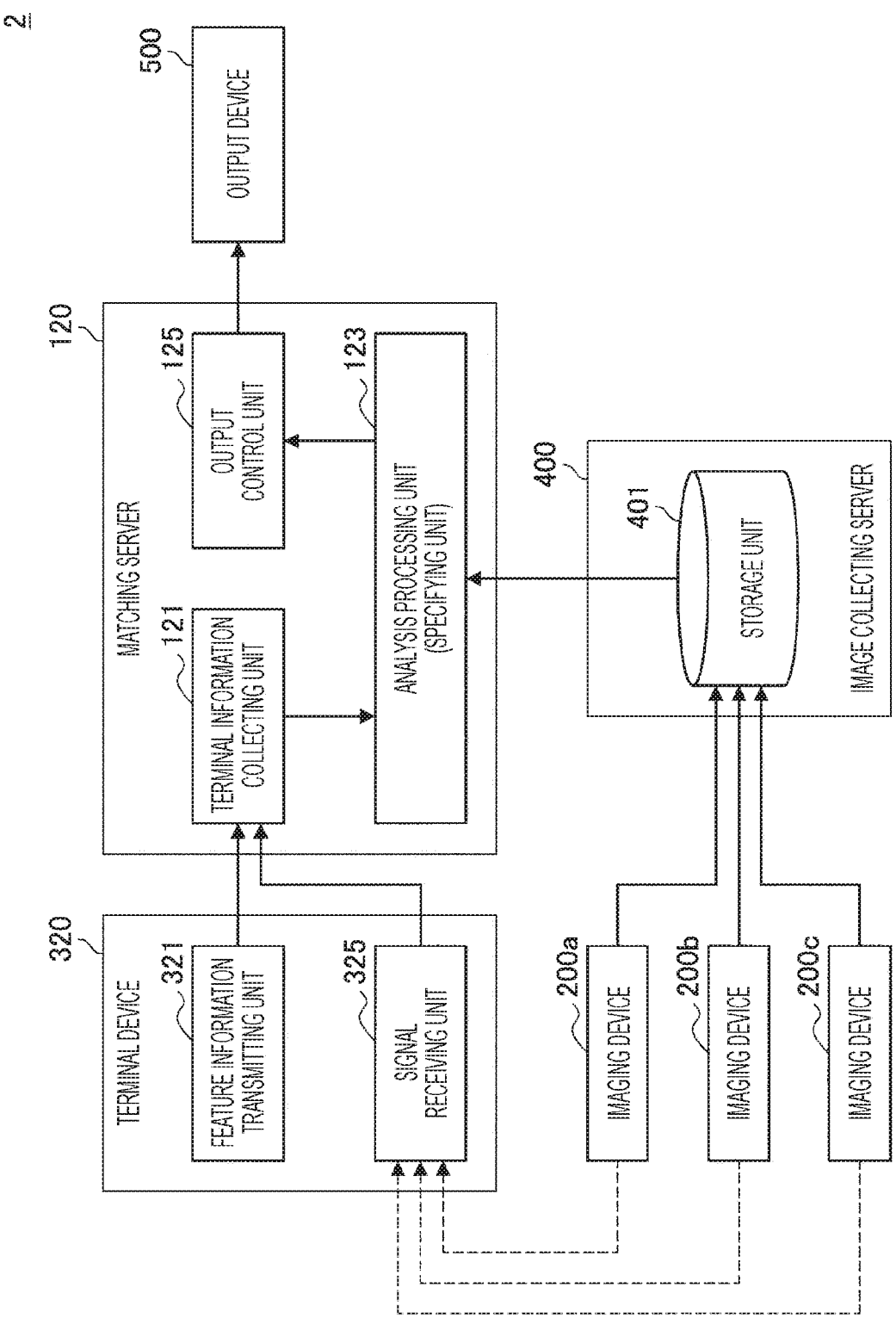
FIG. 7 is a block diagram illustrating an example of a functional configuration of an information processing system according to the embodiment.

Next, an example of a functional configuration of the information processing system 2 according to the present embodiment will be described with reference to FIG. 7. FIG. 7 is a block diagram illustrating an example of a functional configuration of the information processing system 2 according to the present embodiment.

The information processing system 2 according to the present embodiment includes a matching server 120, a plurality of imaging devices 200 (for example, imaging devices 200a to 200c), a terminal device 320, an image collecting server 400, and an output device 500 as illustrated in FIG. 7. Incidentally, the matching server 120, a plurality of imaging devices 200a to 200c, the terminal device 320, the image collecting server 400, and the output device 500 correspond to the matching server 100, a plurality of imaging devices 200a to 200c, the terminal device 300, the image collecting server 400, and the output device 500a or 500b in FIG. 1, respectively. Further, the information processing system 2 according to the present embodiment mainly differs from the information processing system 1 (see FIG. 3) according to the first embodiment in some components of the imaging device 200 and components of the terminal device 320 and the matching server 120. In this regard, a configuration of the information processing system 2 according to the present embodiment will be described focusing on parts different from the information processing system 1 described above with reference to FIG. 3, and detailed description of parts substantially similar to the information processing system 1 will be omitted.

As described above, in the information processing system 2 according to the present embodiment, the imaging device 200 transmits a signal corresponding to information (for example, identification information, or an installation position, or the like) specifying itself to its surrounding (particularly, its own imaging range). Incidentally, although not illustrated in FIG. 7, the imaging device 200 may include a configuration for transmitting the signal. Further, the imaging device 200 may transmit other information in addition to the information specifying itself. As a specific example, a time indicating a time at which an image is captured (that is, an absolute time) or time information indicating a relative time in a series of captured images such as a frame number may be transmitted as the other information. Further, the imaging device 200 may transmit information (for example, a serial number or the like) or the like specifying each captured image as the other information in addition to the time information. In other words, the imaging device 200 may associate the other information (the time information, the information specifying each image, or the like) with the information specifying itself. Incidentally, hereinafter the signal transmitted from the imaging device 200 is also referred to as a "transmission signal."

Further, the terminal device 320 includes a feature information transmitting unit 321 and a signal receiving unit 325. Incidentally, the feature information transmitting unit 321 is substantially similar to the feature information transmitting unit 301 in the terminal device 300 described with reference to FIG. 3, and thus detailed description thereof is omitted.

The signal receiving unit 325 receives the transmission signal from each imaging device 200, and records the reception result of the transmission signal. To this end, the signal receiving unit 325 may include a receiving device that receives the transmission signal transmitted from the imaging device 200. As a more specific example, in a case where an infrared signal is transmitted from each imaging device 200, the signal receiving unit 325 may include a light receiving unit that receives the infrared signal.

Further, the signal receiving unit 325 may associate other information with the reception result of the transmission signal from each imaging device 200. As a specific example, the signal receiving unit 325 may associate time information related to a time (timing) at which the transmission signal is received with the reception result of the transmission signal. Incidentally, as described above, the transmission signal itself may include other information such as time information or information specifying an image.

Further, for example, the signal receiving unit 325 may associate, with the reception result of the transmission signal, the information related to a predetermined feature quantity acquired at a time (timing) at which the signal is received (for example, a detection result of a motion of the terminal device 320 by a detecting unit such as an acceleration sensor or an angular velocity sensor).

Then, the signal receiving unit 325 transmits the information indicating the reception result of the transmission signal from each imaging device 200 directly or indirectly to the matching server 120 at a desired timing. As a specific example, the signal receiving unit 325 may transmit the information indicating the reception result of the transmission signal to the matching server 120 via a predetermined network (for example, the network N11 illustrated in FIG. 1) in accordance with an instruction from the user via a predetermined input unit (not illustrated). Further, as another example, in a case where the terminal device 320 is connected to an information processing device such as a PC via a communication cable or the like, the signal receiving unit 325 may transfer the information indicating the reception result of the transmission signal to the information processing device via the communication cable. In this case, for example, the information processing device may transmit the information indicating the reception result of the transmission signal transferred from the terminal device 320 to the matching server 120. In other words, the terminal device 320 may transmit the information indicating the reception result of the transmission signal indirectly to the matching server 120 via the information processing device such as a PC.

Next, the matching server 120 will be described. The matching server 120 includes a terminal information collecting unit 121, an analysis processing unit 123, and an output control unit 125 as illustrated in FIG. 7. Incidentally, the terminal information collecting unit 121, the analysis processing unit 123, and the output control unit 125 correspond to the terminal information collecting unit 101, the analysis processing unit 103, and the output control unit 105 in the matching server 100 according to the first embodiment described above, respectively.

The terminal information collecting unit 121 acquires the information indicating the reception result of the transmission signal from each imaging device 200 which is recorded by the terminal device 320. At this time, the terminal information collecting unit 121 may acquire the information indicating the reception result of the transmission signal directly from the terminal device 320 or indirectly via another information processing device such as a PC. Further, the terminal information collecting unit 121 may acquire the information indicating a predetermined feature quantity as the information associated with the reception result of the transmission signal. Then, the terminal information collecting unit 121 outputs the information (for example, the information indicating the reception result of the transmission signal) acquired from the terminal device 320 to the analysis processing unit 123.

The analysis processing unit 123 acquires the information indicating the reception result of the transmission signal from each imaging device 200 which is recorded by the terminal device 320 from the terminal information collecting unit 121. The analysis processing unit 123 specifies the imaging device 200 which is likely to capture the image of the target holding the terminal device 320 on the basis of the reception result of the transmission signal from each imaging device 200. As a specific example, the analysis processing unit 123 may specify the imaging device 200 corresponding to the identification information on the basis of the identification information indicated by the transmission signal recorded as the reception result. Further, as another example, the imaging device 200 installed at the position indicated by the position information may be specified on the basis of the position information indicated by the transmission signal recorded as the reception result. Further, at this time, the analysis processing unit 123 may specify the time zone in which the image of the above target is likely to be captured by the imaging device 200 on the basis of the time information associated with the reception result of the transmission signal from each imaging device 200.

Then, the analysis processing unit 123 acquires the image in which the target is likely to be imaged from the image collecting server 400.

Incidentally, a subsequent process is similar to that of the information processing system 1 according to the first embodiment described above. In other words, the analysis processing unit 123 specifies the target holding the terminal device 320 imaged in the image from the images acquired from the image collecting server 400 in accordance with the information indicating the feature quantity transmitted from the terminal device 320. For example, the analysis processing unit 123 may specify the target holding the terminal device 320 from among the subjects imaged in the image acquired from the image collecting server 400 on the basis of the information indicating the detection result of the motion of the terminal device 320 associated with the reception result of the transmission signal. Then, the analysis processing unit 123 may output the information corresponding to the specifying result of the above target from the image acquired from the image collecting server 400 to the output control unit 125 as the information related to the target. Further, the output control unit 125 may acquire the information related to a predetermined target (that is, the target holding the terminal device 320) from the analysis processing unit 123 and present the acquired information to a predetermined output destination.

Incidentally, the analysis processing unit 123 can indirectly recognize the position of the target holding the terminal device 320 at each time (that is, when and where the target stays) on the basis of the information indicating the reception result of the transmission signal from each imaging device 200 recorded by the terminal device 320, as described above. Therefore, the analysis processing unit 123 may output, to the output control unit 125, the information related to the position of the above target recognized on the basis of the information indicating the reception result of the transmission signal from each imaging device 200. Further, in this case, the output control unit 125 may present the information related to the position of the target to a predetermined output destination.

Figure 8:
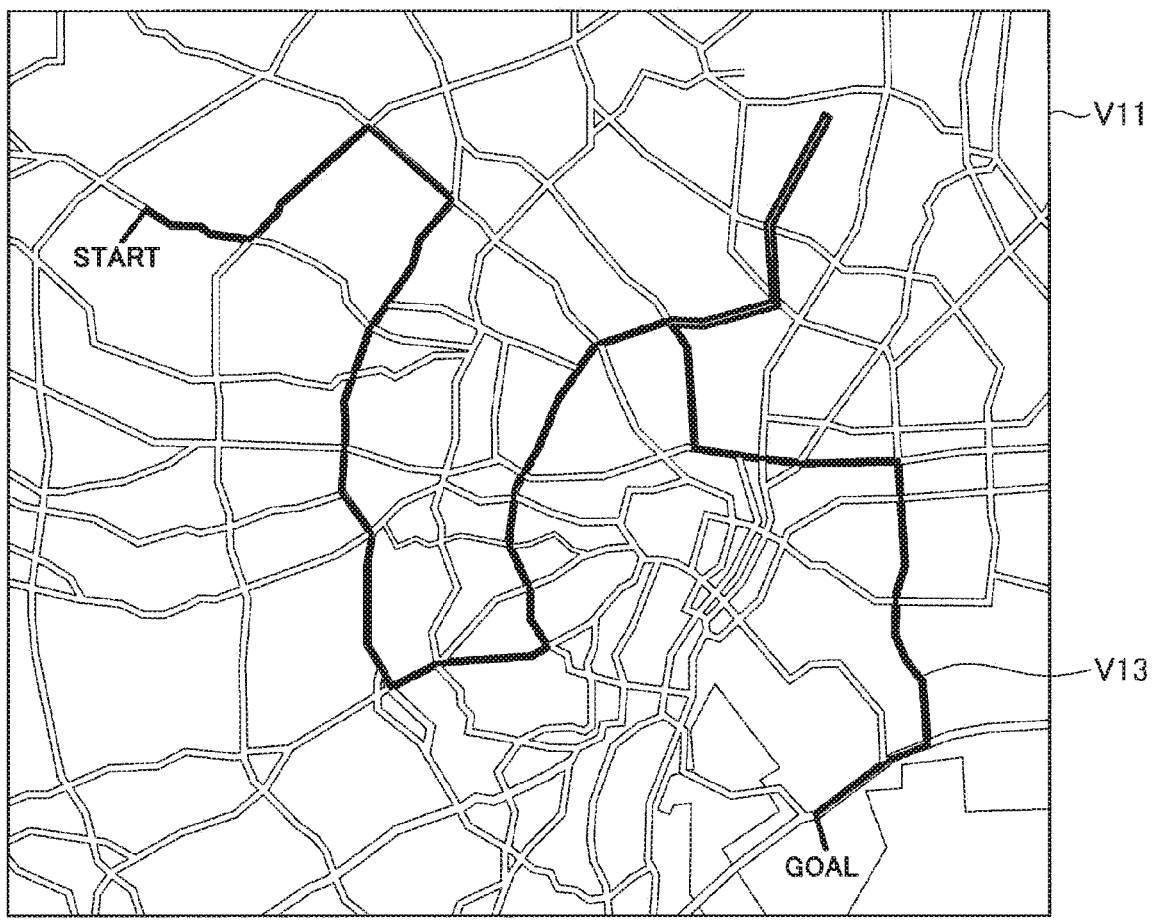
FIG. 8 is an explanatory diagram for describing an example of information related to a position of a predetermined target presented in accordance with a reception result of a transmission signal from each imaging device.

For example, FIG. 8 is an explanatory diagram for describing an example of information related to a position of a predetermined target presented in accordance with the reception result of the transmission signal from each imaging device 200. For example, it is possible to associate the reception result of the transmission signal from each imaging device 200 sequentially recorded chronologically with the installation position of the imaging device 200 and thus specify a chronological change in the position information indicating the position of the target holding the terminal device 320. In other words, in the example illustrated in FIG. 8, the movement path of the target is specified on the basis of the chronological change in the position information indicating the position of the target specified as described above, and display information V13 indicating the movement path is superimposed on map information V11. Incidentally, as described above, in a case where the position of the target is specified on the basis of the reception result of the transmission signal from the imaging device, there are cases in which it is possible to specify the position of the target with a high degree of accuracy as compared with a case where the position is detected by the GNSS or the like. Due to such characteristics, for example, it is also possible to correct the specifying result of the position of the target by the GNSS or the like using the specifying result of the position of the target based on the reception result of the transmission signal.

Incidentally, the above example is merely an example, and a method of presenting the information related to the position of the target recognized on the basis of the information indicating the reception result of the transmission signal from each imaging device 200 is not necessarily limited to the example illustrated in FIG. 8.

Further, in the information processing system 2 according to the present embodiment, at least some functions of the terminal device 320 may be enabled only in a case where it enters the imaging area of each imaging device 200. Since the terminal device 320 according to the present embodiment records the reception result of the transmission signal transmitted from the imaging device 200 as described above, it is possible to execute various types of control with a reception timing of the transmission signal (in other words, a detection timing) as a trigger. By using such characteristics, for example, the terminal device 320 may transmit the information related to a predetermined feature quantity (for example, an optical signal of a predetermined light emission pattern) only in a case where the transmission signal from the imaging device 200 is received. With such a configuration, it is possible to suppress the increase in the power consumption of the terminal device 320 in a case where the information processing system 2 according to the present embodiment is implemented.

The example of the functional configuration of the information processing system 2 according to the present embodiment has been described above with reference to FIGS. 7 and 8.

3.3. Process

Next, an example of a flow of a series of processes of the information processing system 2 according to the present embodiment will be described with reference to FIG. 9, particularly focusing on an operation of the matching server 120. FIG. 9 is a flowchart illustrating an example of a flow of a series of processes of the information processing system 2 according to the present embodiment.

As described above, in the information processing system 2 according to the present embodiment, if the target holding the terminal device 320 enters the imaging area of each imaging device 200, the transmission signal from the imaging device 200 is recorded in the terminal device 320. Further, the matching server 120 (the terminal information collecting unit 121) directly or indirectly acquires the information indicating the reception result of the transmission signal recorded in the terminal device 320 from the terminal device 320 at a desired timing (S201).

Then, the matching server 120 (the analysis processing unit 123) specifies the imaging device 200 which is likely to capture the image of the target holding the terminal device 320 on the basis of the information indicating the reception result of the transmission signal. Then, the matching server 120 acquires the image in which the target is likely to be imaged, that is, the image captured by the specified imaging device 200 from the image collecting server 400. Further, at this time, the matching server 120 may specify the time zone in which the image of the target is likely to be imaged by the imaging device 200 on the basis of the time information associated with the reception result of the transmission signal from each imaging device 200. In this case, the matching server 120 may limit the image acquired from the image collecting server 400 to the image captured in the specified time zone (S203).

Further, the matching server 120 (the analysis processing unit 123) acquires the information related to the predetermined feature quantity transmitted from the terminal device 320. For example, the matching server 120 may acquire the information indicating the detection result of the motion of the terminal device 320 (eventually, the motion of the target holding the terminal device 320) by the detecting unit such as the acceleration sensor or the angular velocity sensor associated with the reception result of the transmission signal as the information related to the feature quantity (S205).

Incidentally, a subsequent process is similar to that in the information processing system 1 (see FIG. 5) according to the first embodiment described above. In other words, the matching server 120 (the analysis processing unit 123) makes an attempt to specify the target from among the subjects imaged in at least some of the images acquired from the image collecting server 400 on the basis of the acquired information related to the feature quantity (S207). Then, the matching server 120 (the output control unit 125) presents the information related to the target to a predetermined output destination on the basis of the specifying result of the target from the acquired image (S209).

The example of the flow of a series of processes of the information processing system 2 according to the present embodiment has been described with reference to FIG. 9, particularly focusing on an operation of the matching server 100.

3.4. Evaluation

As described above, in the information processing system 2 according to the present embodiment, in a case where the transmission signal transmitted from each imaging device 200 to the surroundings is received, the terminal device 320 records the reception result of the transmission signal. Further, the matching server 100 acquires the information indicating the reception result of the transmission signal from terminal device 320 and specifies the imaging device 200 which is likely to capture the image of the target holding the terminal device 320 on the basis of the reception result.

Further, the terminal device 320 may associate the time information related to the time (timing) at which the transmission signal is received with the reception result of the transmission signal. Accordingly, the matching server 100 can also specify the imaging device 200 which is likely to capture the image of the target holding the terminal device 320 and the time at which the image of the target is likely to be captured by the imaging device 200.

With the above configuration, even in a case where the terminal device 320 does not have the function of specifying its own position, it is possible to specify the image in which the target holding the terminal device 320 is imaged from among the images captured by a plurality of imaging devices 200.

Further, similarly to the first embodiment described above, the matching server 120 acquires the image in which the target holding the terminal device 320 is likely to be imaged in accordance with the specifying result of the imaging device 200 and makes an attempt to specify the target from the image. Then, the matching server 120 presents the information related to the target to a predetermined output destination on the basis of the specifying result of the target from the image.

With the above configuration, similarly to the information processing system 1 according to the first embodiment described above, it is possible to specify the image in which a predetermined target (that is, the target holding the terminal device 320) is imaged from among the images randomly captured by the imaging device 200 steadily installed at a predetermined position such as an environmental camera. Therefore, for example, it is also possible to realize a service of specifying an image in which a predetermined target is imaged from among the images randomly captured by the imaging device 200 steadily installed at a predetermined position such as an environmental camera and providing the image. Further, it is also possible to automatically generate a multi-angle image in which a predetermined target is imaged in a plurality of directions on the basis of the images captured by a plurality of imaging devices 200.

4. THIRD EMBODIMENT

4.1. Overview

Next, a third embodiment of the present disclosure will be described. In the present embodiment, an example of a mechanism of applying access restriction to the information related to the target which is output on the basis of a specifying result of a predetermined target from the image.

For example, FIG. 10 is an explanatory diagram for describing an overview of an information processing system according to the present embodiment. Specifically, FIG. 10 illustrates an example in which a situation of a sports event is imaged from various places by the imaging device 200 (for example, a digital video camera) held by each user. For example, in FIG. 10, reference numerals 200d to 200f indicate imaging devices 200 held by different users. Further, in the example illustrated in FIG. 10, it is assumed that each of users Ud to Uf holds the terminal device 300. In other words, in the example illustrated in FIG. 10, a situation in which a venue of a sports event (for example, a competition space or the like, such as a track) is imaged from different positions by the imaging devices 200d to 200f held by related persons of the users Ud to Uf is schematically illustrated.

On the basis of such a configuration, the matching server 100 according to the present embodiment specifies a predetermined target (for example, the users Ud to Uf) from the images captured by the imaging devices 200d to 200f and controls access to the information related to the target in accordance with the specifying result.

For example, the matching server 100 may restrict the users who can access the image in accordance with the specifying results of the users Ud to Uf from the images captured by the imaging devices 200d to 200f. As an example of a more specific situation, it is assumed that the user Ue is specified in the image captured by the imaging device 200d. In this case, for example, the matching server 100 may permit the access to the image to the user Ue or the user of the imaging device 200e who is a related person of the user Ue in addition to the user of the imaging device 200d and the user Ud who is a related person of the user and restrict access from other users. Further, at this time, the matching server 100 may mutually permit the access of each images captured by the imaging devices 200d and 200e between the user of the imaging device 200d and the related person of the user and the user of the imaging device 200e and the related person of the user.

Further, a case where as long as information which is subject to access control by the matching server 100 is information related to a predetermined target (that is, the target holding terminal device 300) specified from each imaging device 200, it is not limited to the image in which the target is captured as in the above-described example. For example, information related to an external appearance (for example, clothes, or the like) of a predetermined target imaged in an image may be output to a predetermined output destination as the information related to the target, and access to the information may be restricted depending on the specifying result of the target.

Incidentally, as a configuration of the information processing system according to the present embodiment, for example, a configuration similar to that of the information processing system (see FIG. 3) according to the first embodiment or that of the information processing system 2 according to the second embodiment (see FIG. 7) can be applied. Further, in this case, for example, it is desirable that the output control unit 105 in the matching server 100 according to the first embodiment or the output control unit 125 in the matching server 120 according to the second embodiment execute the above-described access control.

With the above configuration, for example, the information processing system according to the present embodiment can permit access to the information related to the target which is output on the basis of the specifying result of the predetermined target from the image only to some users (the target holding the terminal device 300 or the related person of the target). Accordingly, for example, it is possible to prevent the occurrence of a situation in which the information related to the specified target (for example, the image in which the target is imaged) is exploited by other persons who are not related to the target while implementing sharing of the above-described information among some users. Further, since access to the information related to the specified target is limited, it is also possible to prevent the occurrence of a situation in which the information is used for a purpose different from an intended purpose.

The overview of the information processing system according to the present embodiment has been described above with reference to FIG. 10. Incidentally, an example of a process of the information processing system processing according to the present embodiment will be described below in more detail.

4.2. Process

Next, an example of a flow of a series of processes of the information processing system according to the present embodiment will be described with reference to FIG. 11, particularly focusing on the operation of the matching server 100. FIG. 11 is a flowchart illustrating an example of a flow of a series of processes of the information processing system according to the present embodiment. Incidentally, for convenience, the present description will proceed under the assumption that a configuration similar to the information processing system 1 (see FIG. 3) according to the first embodiment described above is applied as the configuration of the information processing system according to the present embodiment.

As illustrated in FIG. 11, the matching server 100 (the analysis processing unit 103) acquires the image captured by the imaging device 200 registered in advance from the image collecting server 400. Further, at this time, the matching server 100 may specify the imaging device 200 which is likely to capture the target holding the terminal device 300 in accordance with the information related to the position of the terminal device 300, similarly to the other embodiments described above. In this case, the matching server 100 may limit the image acquired from the image collecting server 400 to the image captured by the specified imaging device 200. Further, the matching server 100 may specify the time zone in which the image of target is likely to be imaged and limit the image acquired from the image collecting server 400 to the image captured in the specified time zone, similarly to the other embodiments described above (S301)

Further, the matching server 100 (the analysis processing unit 103) acquires the information related to the predetermined feature quantity transmitted from the terminal device 300. For example, the matching server 100 may acquire the information indicating the detection result of the motion of the terminal device 300 (eventually, the motion of the target holding the terminal device 300) by the detecting unit such as the acceleration sensor or the angular velocity sensor which is transmitted from the terminal device 300 as the information related to the feature quantity (S303).

Then, the matching server 100 (the analysis processing unit 103) makes an attempt to specify the target among the subjects imaged in at least some of the images acquired from the image collecting server 400 on the basis of the acquired information related to the feature quantity (S305).

Then, the matching server 100 (the output control unit 105) presents the information related to the target to a predetermined output destination on the basis of the specifying result of the target from the acquired image. At this time, the matching server 100 may control (for example, limit) access to the information related to the target on the basis of the specifying result of the target. As a specific example, the matching server 100 may permit access to the information related to the target only to the target or the related person of the target and restrict access from other users. Incidentally, this access control may be executed by other devices which are information output destinations instead of the matching server 100. In this case, the matching server 100 may transmit information (for example, the information or the like indicating the specifying result of the target) necessary for other devices which are the information output destination to perform access control to the other devices (S307).

The example of the flow of a series of processes of the information processing system according to the present embodiment has been described above with reference to FIG. 11, particularly focusing on an operation of the matching server 100.

4.3. Example

Next, an example of control related to output of the information related to the target based on the specifying result of the predetermined target by the matching server 100 will be described as an example of the information processing system according to the present embodiment.

For example, FIG. 12 is an explanatory diagram for describing an example of the information processing system according to the present embodiment. In the example illustrated in FIG. 12, the matching server 100 clips a part in the image in which the user Ud is imaged as a partial image V213 from an image V211 captured by some of the imaging devices 200 on the basis of the specifying result of the user Ud. With such control, the matching server 100 may limit, for example, the subject imaged in the partial image V213 to the user Ud (that is, exclude a part in which other users are imaged) and permit access to the partial image V213 only to the user Ud and the related person of the user Ud.

Further, as described above, according to the information processing system according to the present embodiment, it is possible to permit the access to the information related to the target which is output on the basis of the specifying result of the predetermined target from the image only to some users. Therefore, for example, the matching server 100 can generate a multi-angle image by combining the images of the users Ud to Uf captured by the imaging devices 200d to 200f held by the related persons of the users Ud to Uf who are specific targets.

Figure 13:
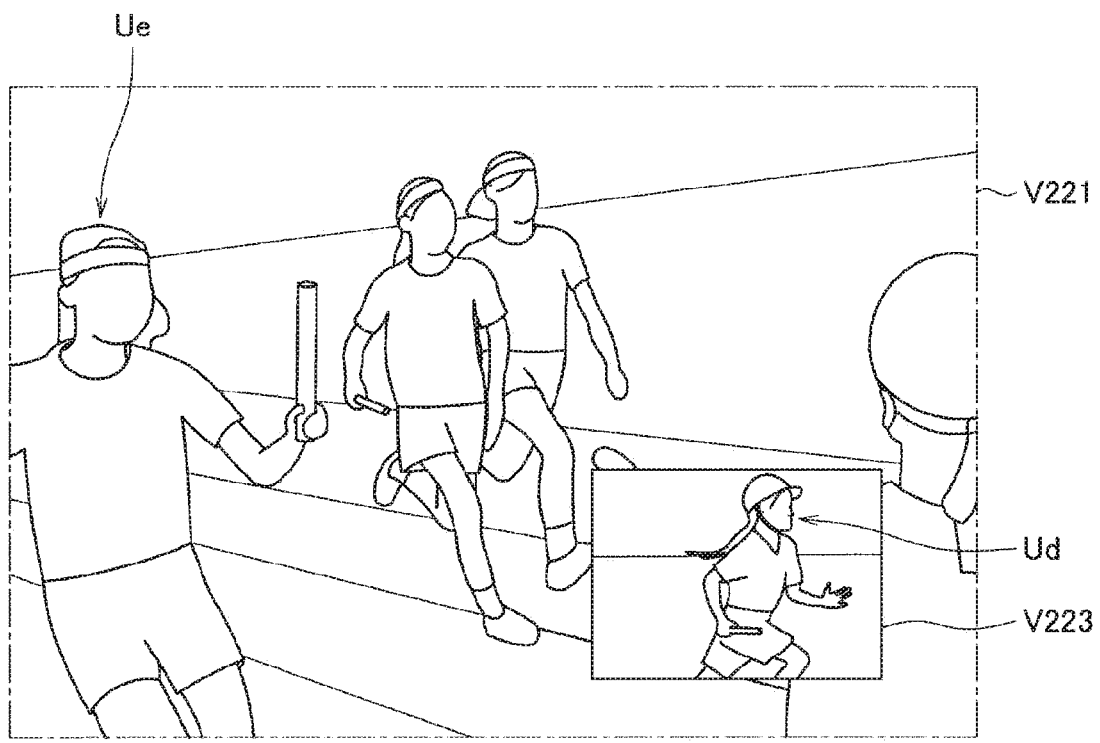
FIG. 13 is an explanatory diagram for describing another example of an information processing system according to the embodiment.

For example, FIG. 13 is an explanatory diagram for describing another example of the information processing system of the present embodiment and illustrates an example of the multi-angle image. In FIG. 13, an image V221 indicates an image captured by the imaging device 200d held by the related person of the user Ud. Further, an image V223 indicates an image captured by the imaging device 200e held by the related person of the user Ue.

In other words, in the example illustrated in FIG. 13, the user Ue is shown in the image captured by the imaging device 200d, and the user Ud is shown in the image captured by the imaging device 200e. In such a case, for example, the matching server 100 may generate a multi-angle image by combining the image V221 and the image V223 and permit the accesses to the multi-angle image to the users Ud and Ue and the related persons thereof and restrict access from other users.

Figure 14:
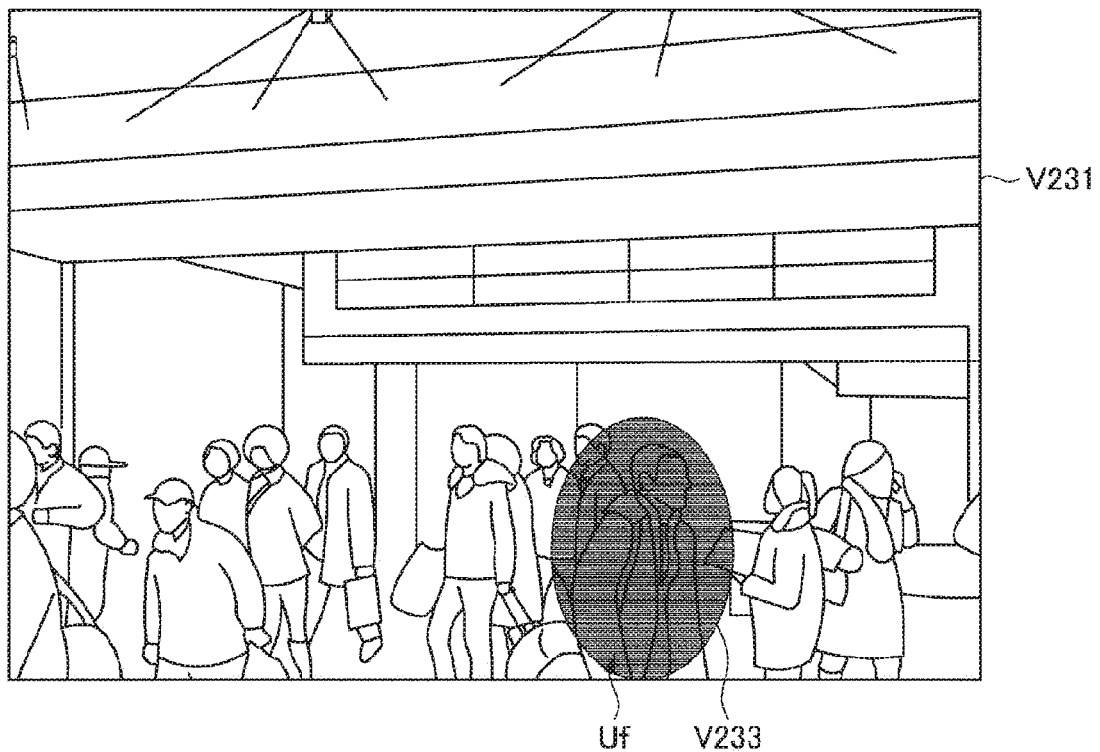
FIG. 14 is an explanatory diagram for describing another example of an information processing system according to the embodiment.

Further, FIG. 14 is an explanatory diagram for describing another example of the information processing system according to the present embodiment. The example in FIG. 14 illustrates a situation in which the user Uf holding the terminal device 300 is unintentionally imaged by the imaging device 200 such as an environmental camera. In such a case, in order to prevent the occurrence of a situation in which a video of the user Uf is referred to by other users, the matching server 100 may execute, for example, predetermined image processing on the image in which the user Uf is imaged. As a specific example, in the example illustrated in FIG. 14, the matching server 100 executes a mask process of masking a part in which the user Uf is imaged as in reference numeral V233 on the image V231 in which the user Uf is imaged. Incidentally, in such a case, in order to prevent the occurrence of a situation in which the user Uf is specified on the basis of the information related to the predetermined feature quantity transmitted from the terminal device 300 held by the user Uf, information which is temporarily generated may be used as the information related to the feature quantity. Accordingly, it is possible to prevent the occurrence of a situation in which other users refer to the information related to the user Uf presented in the image V231 (that is, a situation in which other users access the information related to the user Uf).

The example of the control related to the output of the information related to the target based on the specifying result of the predetermined target by the matching server 100 has been described above with reference to FIGS. 12 and 13 as an example of the information processing system according to the present embodiment.

4.4. Evaluation

As described above, the information processing system according to the present embodiment permits, for example, access to the information related to the target, which is output on the basis of the specifying result of the predetermined target from the image only to some users. Accordingly, for example, it is possible to prevent the occurrence of a situation in which the information related to the identified target is exploited by other users not related to the target or the occurrence of a situation in which the information is used for a purpose different from an intended purpose.

5. FOURTH EMBODIMENT

5.1. Overview

Figure 15:
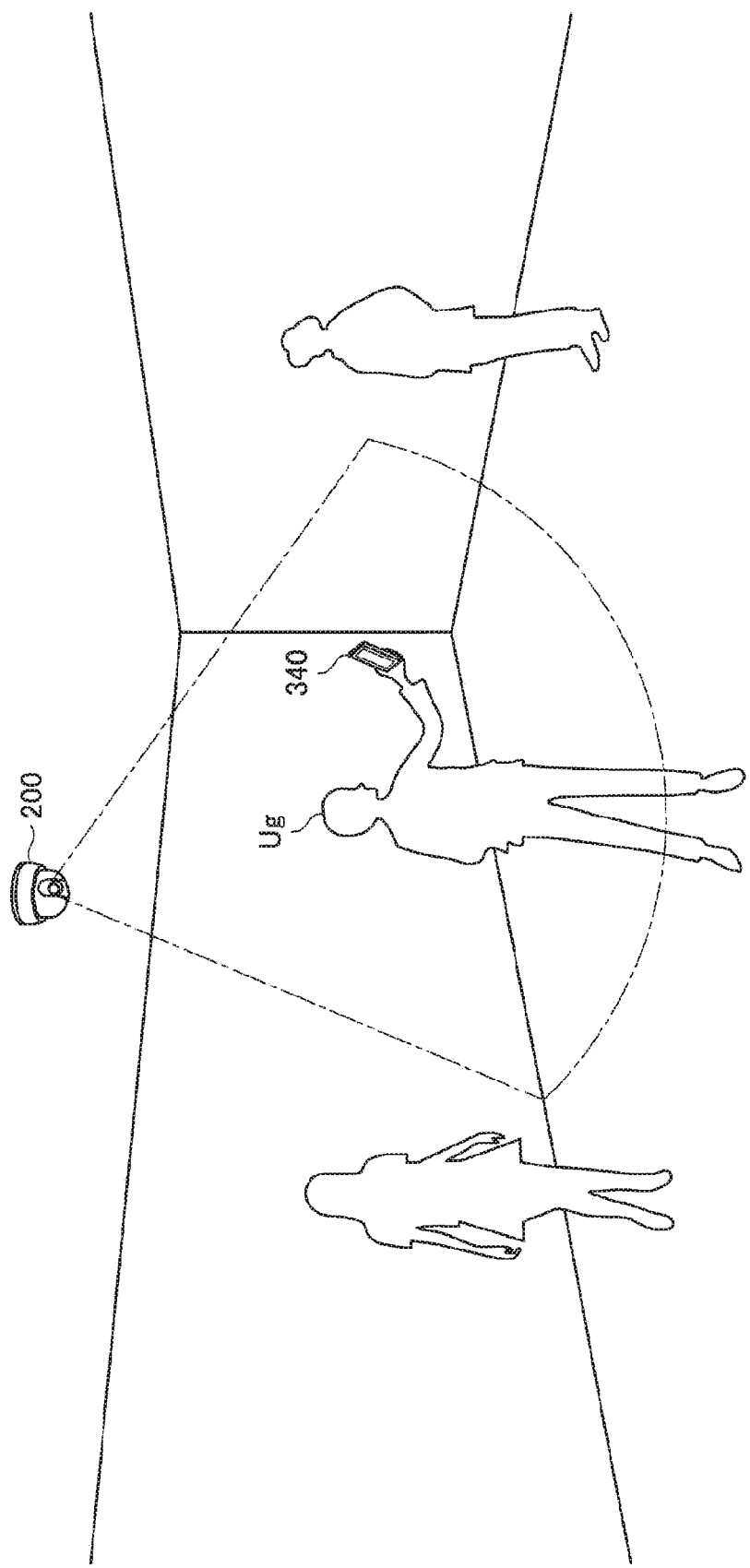
FIG. 15 is an explanatory diagram for describing an overview of an information processing system according to a fourth embodiment of the present disclosure.
Figure 16:
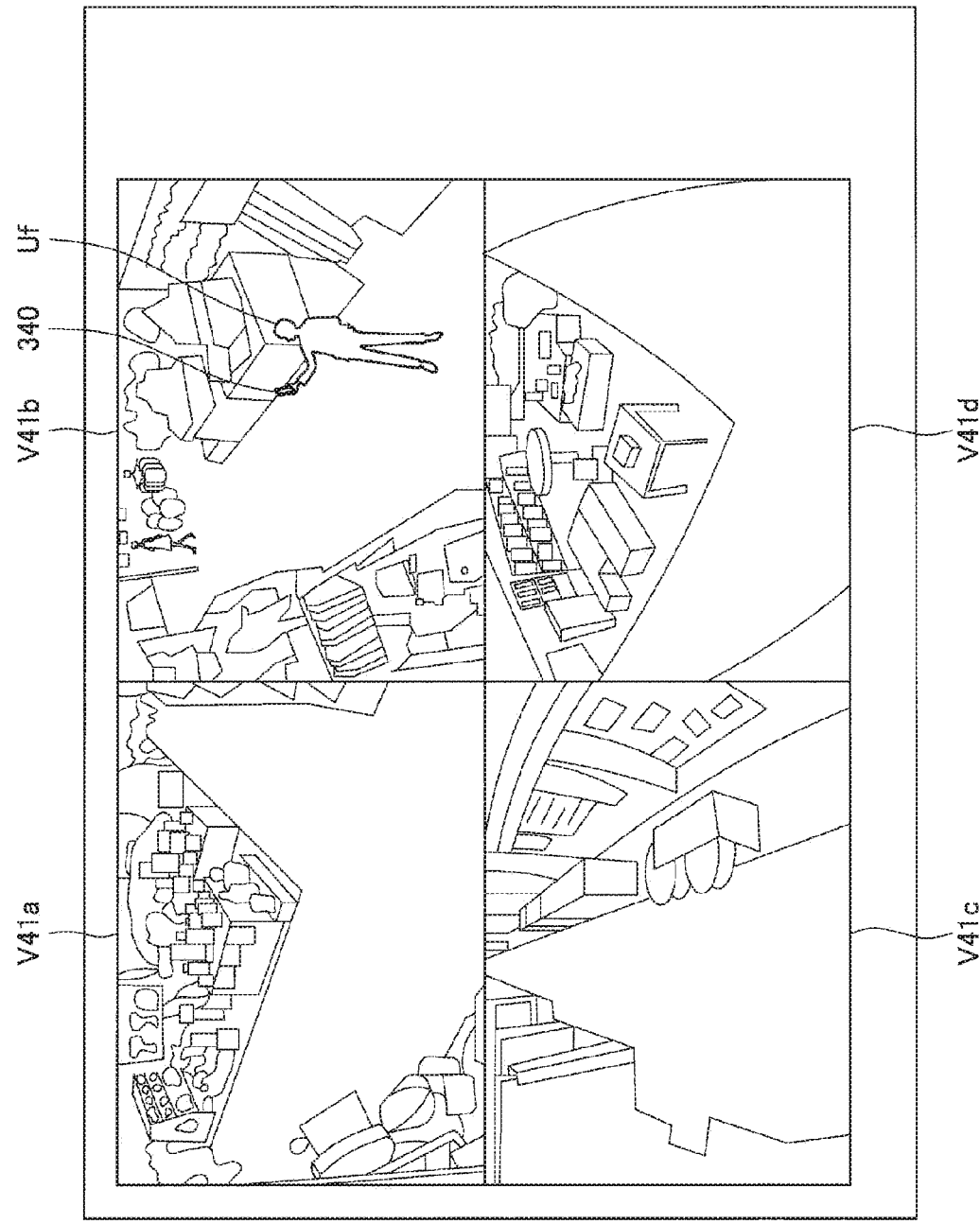
FIG. 16 is an explanatory diagram for describing an overview of an information processing system according to the embodiment.
Figure 17:
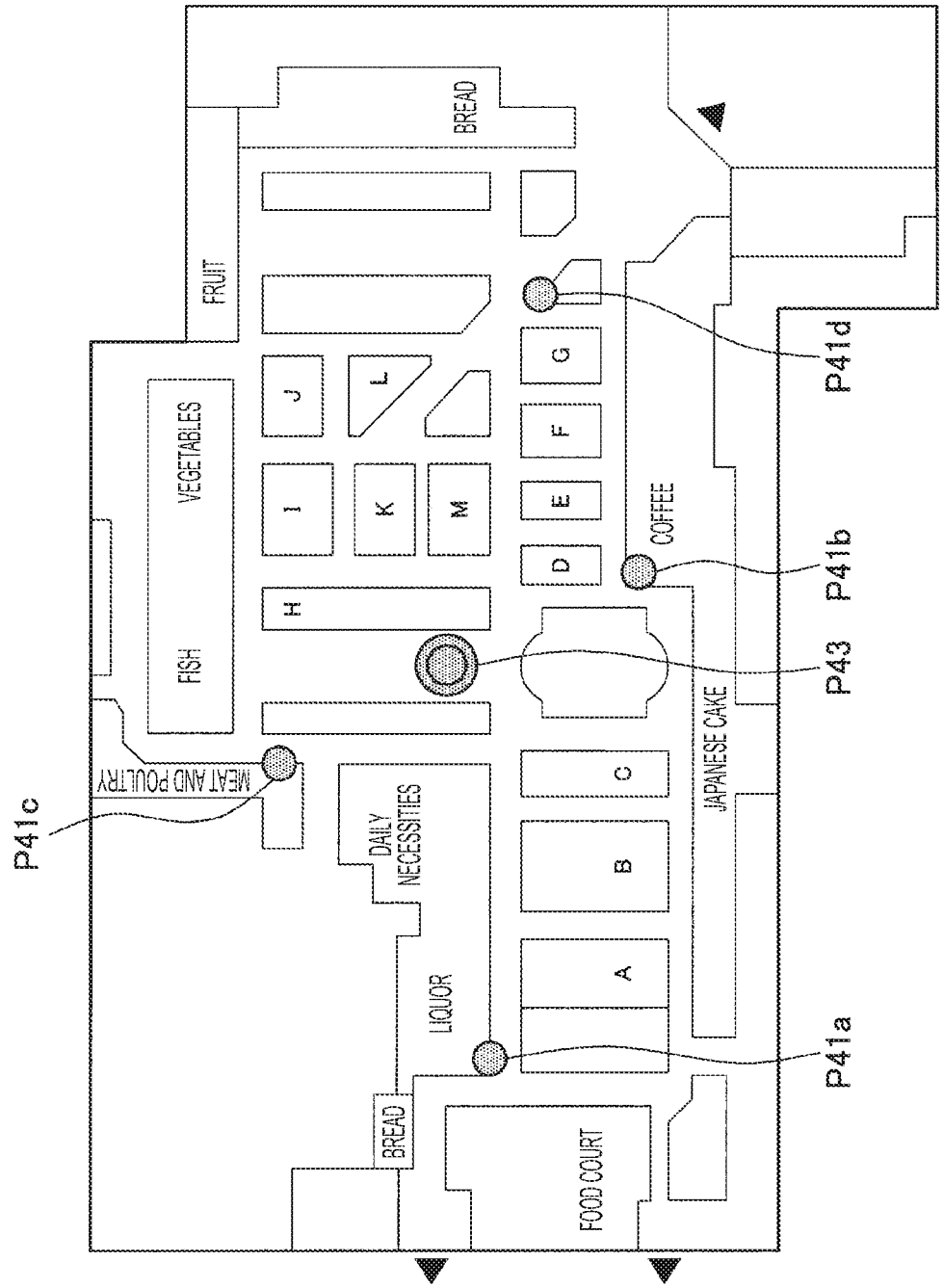
FIG. 17 is an explanatory diagram for describing an overview of an information processing system according to the embodiment.

Next, a fourth embodiment of the present disclosure will be described. For example, FIGS. 15 to 17 are explanatory diagrams for describing an overview of an information processing system according to the present embodiment. Incidentally, in the present description, the information processing system according to the present embodiment is also referred to as an "information processing system 4" in order to distinguish it from the information processing systems according to the other embodiments described above. Similarly, the terminal device and the matching server according to the present embodiment are also referred to as a "terminal device 340" and a "matching server 140."

The information processing system according to the present embodiment specifies, for example, the position of the target using a specifying result of a predetermined target from an image captured by the imaging device 200 such as the environmental camera even under an environment in which it is difficult to use the GNSS or the like such as an underground mall.

For example, FIG. 15 schematically illustrates a situation in which a user Ug holding the terminal device 340 is positioned within the angle of view (that is, in the imaging area) of the imaging device 200 configured as the environmental camera. Under such circumstances, for example, if the terminal device 340 causes a light emitting unit to emit light with a predetermined light emission pattern (that is, if an optical signal is transmitted to the outside), the light emitting unit is shown in the image captured by the imaging device 200 as a light emitter emitting light with the light emission pattern.

By using such characteristics, in the information processing system 4 according to the present embodiment, the matching server 140 specifies the imaging device 200 which captures the light emitter among a plurality of imaging devices 200 and thus specifies a predetermined target (for example, the user Ug) in accordance with the installation position of the imaging device 200.

For example, FIG. 16 illustrates an example of images captured by a plurality of imaging devices 200 installed at different positions. Images V41a to V41d illustrated in FIG. 16 indicate images captured by the imaging devices 200 installed at different positions. Incidentally, in the present description, for convenience, the imaging devices 200 which capture the images V41a to V41d are also referred to as imaging devices 200a to 200d, respectively. Here, in the example illustrated in FIG. 16, the user Uf holding the terminal device 340 is shown in the image V41b. In such a state, if the terminal device 340 transmits an optical signal of a predetermined light emission pattern, a light emitter emitting light with the light emission pattern is shown in the image V41b.

Further, FIG. 17 schematically illustrates positions of the imaging devices 200 (that is, the imaging devices 200a to 200d) that capture the images V41a to V41d illustrated in FIG. 16. In FIG. 17, positions on the maps indicated by reference numeral P41a to P41d schematically indicate the positions of the imaging devices 200a to 200d that capture the images V41a to V41d.

In other words, in the case of the example illustrated in FIG. 16 and FIG. 17, the matching server 140 performs image processing on each of the images V41a to V41d on the basis of the optical signal transmitted from the terminal device 340 and specifies the target (that is, the user Uf) holding the terminal device 340 from the image V41b. Then, the matching server 140 recognizes that the target is positioned in the imaging area of the imaging device 200b that captures the image V41b on the basis of the specifying result of the target. Then, the matching server 140 specifies the position of the target in the real space in accordance with the installation position of the imaging device 200b and the position of the target in the image V41b. For example, in the case of the example illustrated in FIGS. 16 and 17, the position indicated by reference numeral P43 in FIG. 17 is the position of the target (that is, the user Uf) imaged in the image V41b.

With the above configuration, it is possible to specify the position of the target using the specifying result of the predetermined target from the image captured by the environmental camera or the like even under a situation in which it is difficult to use the function of specifying the position of the predetermined target such as the GNSS.

The overview of the information processing system according to the present embodiment has been described above with reference to FIGS. 15 to 17. Incidentally, an example of a configuration and a process of the information processing system according to the present embodiment will be described below in more detail.

5.2. Functional Configuration

Figure 18:
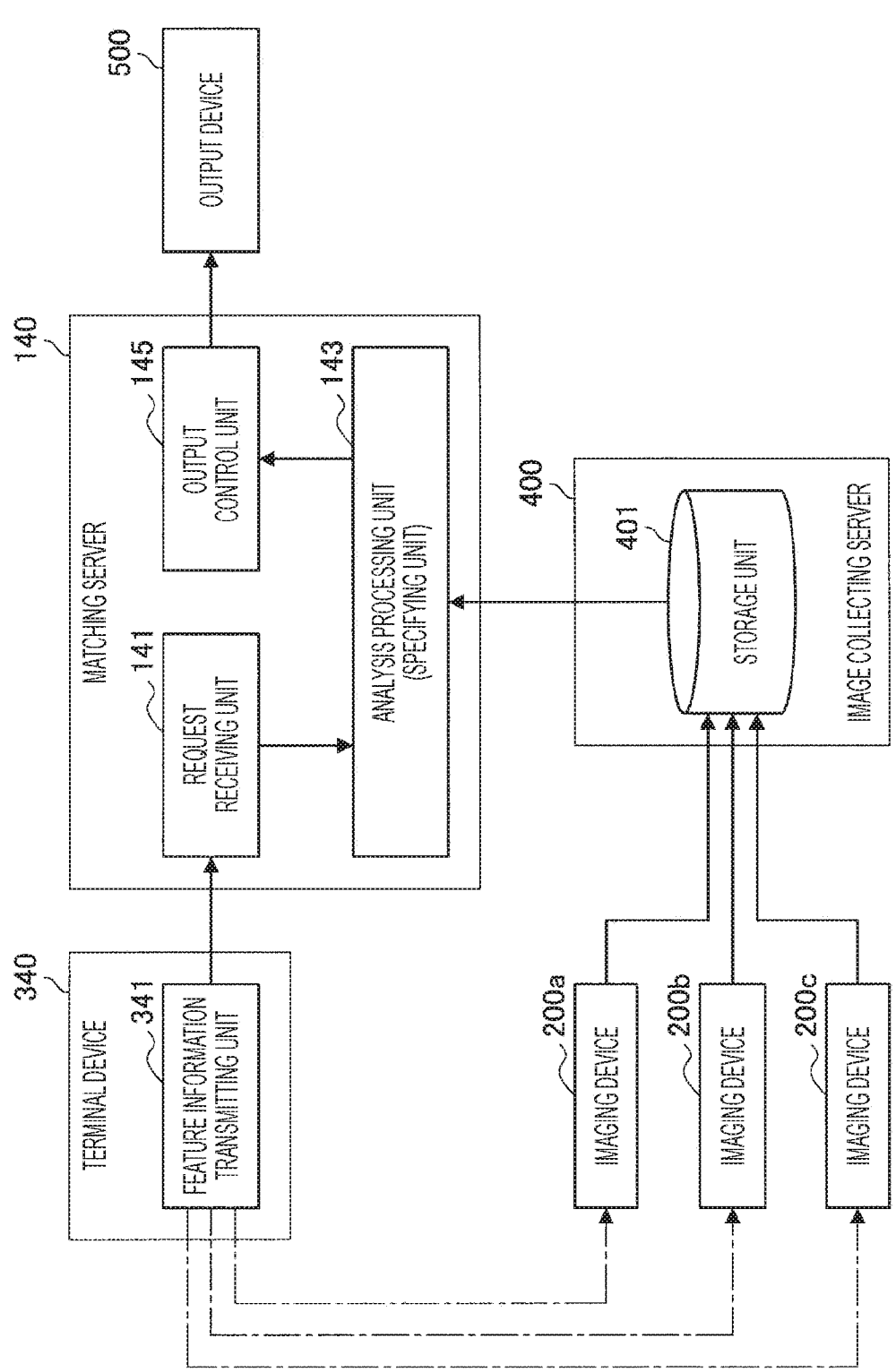
FIG. 18 is a block diagram illustrating an example of a functional configuration of an information processing system according to the embodiment.

Next, an example of a functional configuration of the information processing system 4 according to the present embodiment will be described with reference to FIG. 18. FIG. 18 is a block diagram illustrating an example of a functional configuration of the information processing system 4 according to the present embodiment.

The information processing system 4 according to the present embodiment includes a matching server 140, a plurality of imaging devices 200 (for example, imaging devices 200a to 200c), a terminal device 340, and an image collecting server 400, and an output device 500 as illustrated in FIG. 18. Incidentally, the matching server 140, a plurality of imaging devices 200a to 200c, the terminal device 340, the image collecting server 400, and the output device 500 correspond to the matching server 100, a plurality of imaging devices 200a to 200c, the terminal device 300, the image collecting server 400, and the output device 500a or 500b in FIG. 1, respectively. Further, the information processing system 4 according to the present embodiment mainly differs from the information processing system 1 (see FIG. 3) according to the first embodiment in configurations of the terminal device 340 and the matching server 140. In this regard, a configuration of the information processing system 4 according to the present embodiment will be described focusing on parts different from the information processing system 1 described above with reference to FIG. 3, and detailed description of parts substantially similar to those of the information processing system 1 will be omitted.

First, a configuration of the terminal device 340 will be described. The terminal device 340 includes a feature information transmitting unit 341 as illustrated in FIG. 18.

The feature information transmitting unit 341 transmits to the outside first information indicating a predetermined feature quantity which is actualized as a video in the image captured by the imaging device 200 on the basis of a predetermined trigger such as an instruction from the user via a predetermined input unit (not illustrated). As a specific example, as described with reference to FIG. 15 to FIG. 17, the feature information transmitting unit 341 may cause the light emitting unit to emit light with a predetermined light emission pattern and transmit an optical signal of the light emission pattern to the outside.

Further, the feature information transmitting unit 341 gives a notification indicating that the above first information is transmitted to the outside to the matching server 140 and requests the matching server 140 to specify the position of the terminal device 340 (eventually, the target holding the terminal device 340). Further, at this time, the feature information transmitting unit 341 may notify the matching server 140 of second information indicating a predetermined feature quantity for specifying the first information from the image captured by each imaging device 200. As a specific example, the feature information transmitting unit 341 may notify the matching server 140 of information specifying the light emission pattern of the optical signal transmitted to the outside as the second information.

Next, a configuration of the matching server 140 will be described. The matching server 140 includes a request receiving unit 141, an analysis processing unit 143, and an output control unit 145 as illustrated in FIG. 18.

The request receiving unit 141 receives a request for specifying the position from the terminal device 340. Further, at this time, the request receiving unit 141 may acquire from the terminal device 340 the second information specifying the first information that the terminal device 340 transmits to the outside. Then, upon receiving the request from the terminal device 340, the request receiving unit 141 instructs the analysis processing unit 143 to specify the position of the terminal device 340. Further, at this time, in a case where the request receiving unit 141 acquires the second information from the terminal device 340, the request receiving unit 141 notifies the analysis processing unit 143 of the second information.

In response to the instruction from the request receiving unit 141, the analysis processing unit 143 specifies the position of the terminal device 340 on the basis of the first information transmitted from the terminal device 340 which is a request transmission source.

Specifically, first, the analysis processing unit 143 acquires the images captured by a plurality of imaging devices 200 from the image collecting server 400. At this time, the analysis processing unit 143 may limit the image acquired from the image collecting server 400 to the images captured at the time at which the request is transmitted from the terminal device 340. Further, in a case where the analysis processing unit 143 knows a rough area in which the terminal device 340 is positioned, the analysis processing unit 143 may limit the image acquired from the image collecting server 400 to the image captured by the imaging device 200 included in the area.

Then, the analysis processing unit 143 makes an attempt to specify the target holding the terminal device 340 from the subjects imaged in at least some images among the imaged acquired from the images acquired from the image collecting server 400 on the basis of the first information transmitted from the terminal device 340. Further, at this time, the analysis processing unit 143 may recognize the feature quantity indicated by the first information on the basis of the second information notified from the request receiving unit 141. As a specific example, in a case where an optical signal of a predetermined light emission pattern is transmitted as the first information, the analysis processing unit 143 may recognize the light emission pattern on the basis of the second information.

In a case where the target is specified from at least some images among the acquired images, the analysis processing unit 143 specifies the position of the target in the real space in accordance with the installation position of the imaging device 200 which is an imaging source of the image from which the target is specified and the position of the target in the image. Then, the analysis processing unit 143 outputs information indicating the specifying result of the position of the target in the real space to the output control unit 145 as the information related to the target.

The output control unit 145 acquires the information indicating the specifying result of the position of the target from the analysis processing unit 143 and presents the information to a predetermined output destination in a predetermined output form. As a specific example, the output control unit 145 may transmit map information in which the position of the target is indicated on a map to a predetermined output device 500. Further, in this case, the terminal device 340 may double as the output device 500. Incidentally, an example of a use case in which the terminal device 340 doubles as the output device 500 will be described later separately as an example.

The example of the functional configuration of the information processing system 4 according to the present embodiment has been described above with reference to FIG. 18.

5.3. Process

Figure 19:
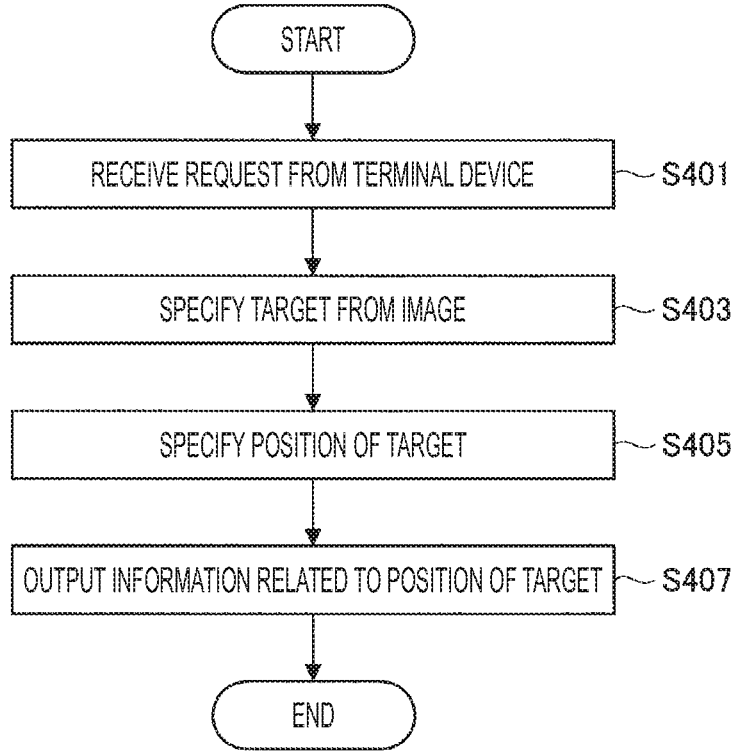
FIG. 19 is a flowchart illustrating an example of a flow of a series of processes of an information processing system according to the embodiment.

Next, an example of a flow of a series of processes of the information processing system 4 according to the present embodiment will be described with reference to FIG. 19, particularly focusing on an operation of the matching server 140. FIG. 19 is a flowchart illustrating an example of a flow of a series of processes of the information processing system 4 according to the present embodiment.

As described above, the terminal device 340 transmits the first information indicating the predetermined feature quantity to the outside on the basis of the predetermined trigger and requests the matching server 140 to specify the position of the terminal device 340 itself (eventually, the target holding the terminal device 340). In other words, the matching server 140 (the request receiving unit 141) receives the request for specifying the position from the terminal device 340. Further, at this time, the matching server 140 may acquire from the terminal device 340 the second information specifying the first information that the terminal device 340 transmits to the outside (S401).

Then, the matching server 140 (the analysis processing unit 143) acquires the images captured by a plurality of imaging devices 200 from the image collecting server 400. Incidentally, at this time, the matching server 140 may limit the image acquired from the image collecting server 400 in accordance with the time at which the request is transmitted, the area in which the terminal device 340 of the request source is positioned, or the like. Further, the matching server 140 makes an attempt to specify the target holding the terminal device 340 from among the subjects imaged in at least some images among the images acquired from the image collecting server 400 on the basis of the first information transmitted from the terminal device 340 (S403).

In a case where the target is specified from at least some images among the acquired images, the matching server 140 (the analysis processing unit 143) specifies the position of the target in the real space in accordance with the installation position of the imaging device 200 which is an image source of the image in which the target is specified and the position of the target in the image (S405).

Then, the matching server 140 (the output control unit 145) presents the information indicating the specifying result of the position of the target to a predetermined output destination in a predetermined output form. As a specific example, the matching server 140 may transmit the map information in which the position of the target is indicated on the map to the terminal device 340 held by the target. Accordingly, the target can recognize his/her own position on the basis of the map information displayed on the output unit (for example, the display) or the like of the terminal device 340.

The example of the flow of a series of processes of the information processing system 4 according to the present embodiment has been described with reference to FIG. 19, particularly focusing on the operation of the matching server 140.

5.4. Example

Figure 20:
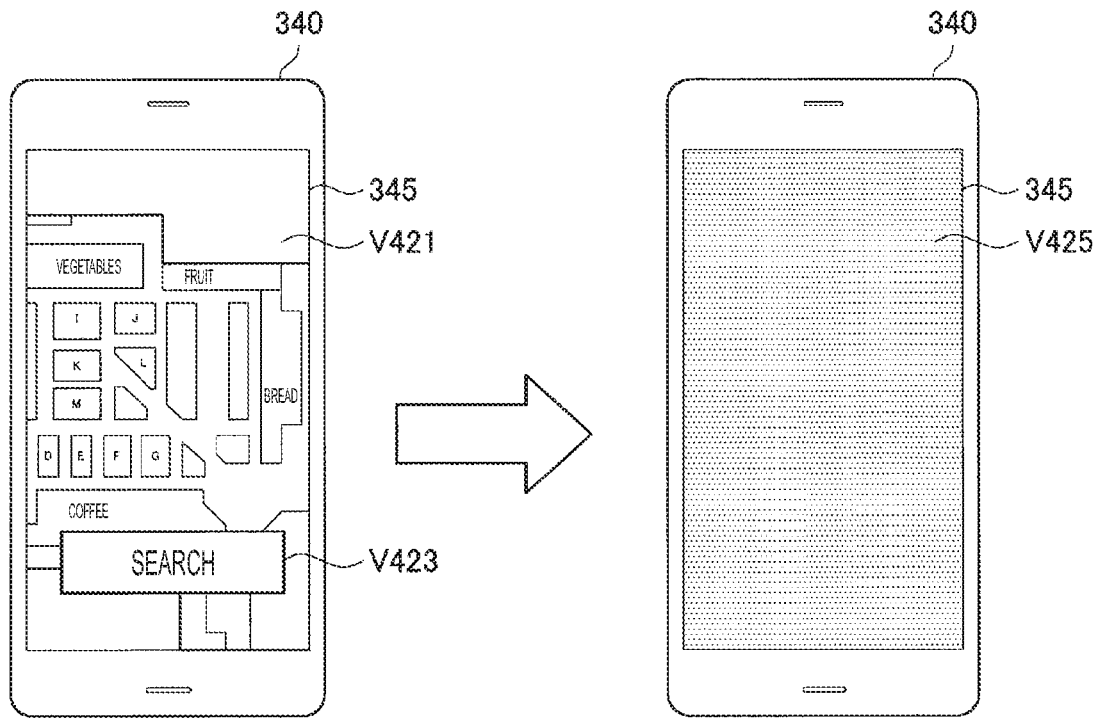
FIG. 20 is an explanatory diagram for describing an example of an information processing system according to the embodiment.
Figure 21:
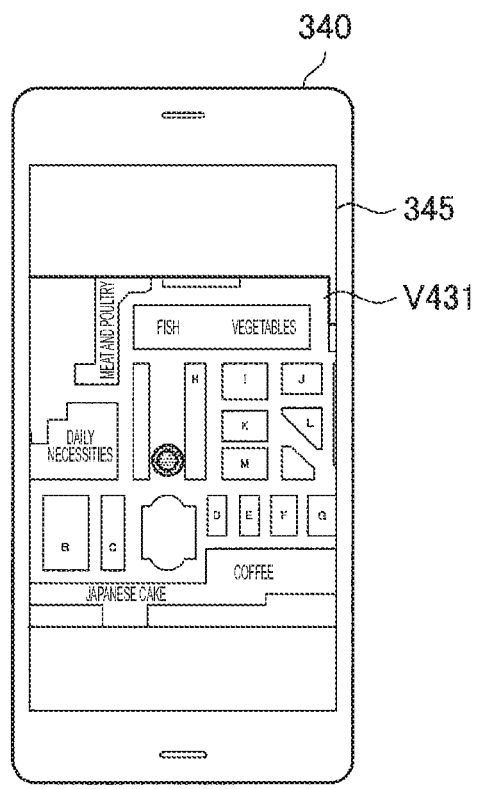
FIG. 21 is an explanatory diagram for describing an example of an information processing system according to the embodiment.

Next, an example of the information processing system according to the present embodiment will be described with reference to FIGS. 20 and 21. FIGS. 20 and 21 are explanatory diagrams for describing an example of the information processing system according to the present embodiment. Incidentally, in the present example, an example of a use case in which a portable information processing device such as a so-called smartphone or a tablet terminal is used as the terminal device 340 and the output device 500 will be described.

First, an example of an operation image in a case where the user Ug requests the matching server 140 to specify a position to via the terminal device 340 will be described with reference to FIG. 20. For example, a diagram on a left side of FIG. 20 illustrates an example of a user interface (UI) by which the user Ug requests the matching server 140 to specify a position to via the terminal device 340. Specifically, the terminal device 340 presents map information V421 indicating the current location on an output unit 345 (for example, a display or the like) on the basis of the detected position information by the GNSS or the like.

Under such circumstances, for example, the terminal device 340 presents a UI for requesting the matching server 140 to specify the current location to in a case where it is difficult to receive GNSS radio waves. As a specific example, in the example illustrated in a diagram on a left side of FIG. 20, the terminal device 340 presents a search button V423 to the user Ug as the UI.

Then, when the search button V423 is operated, the terminal device 340 requests the matching server 140 to specify the current location via a predetermined network and transmits the first information indicating the predetermined feature quantity to the outside. For example, a diagram on a right side of FIG. 20 illustrates an example of a state in which the terminal device 340 transmits the first information. Specifically, the terminal device 340 causes the output unit 345 to emit light with a predetermined light emission pattern using the output unit 345 as the light emitting unit and transmits the optical signal of the light emission pattern as the first information. As a more specific example, as indicated by reference numeral V425, the terminal device 340 may transmit an optical signal of a predetermined light emission pattern such as a uniform pattern causing the entire output unit 345 to emit light, for example, by switching luminance of the light emission. Accordingly, for example, as illustrated in FIG. 15, if the user Ug holding the terminal device 340 is positioned in the imaging area of some imaging devices 200 such as the environmental camera or the like, the output unit 345 emitting light with a predetermined light emission pattern is shown in the image captured by the imaging device 200.

Further, as described above, the matching server 140 specifies the imaging device 200 which captures the light emitter (that is, the output unit 345 of the terminal device 340) by specifying the light emitter that emits light with a predetermined light emission pattern from among the images captured by the imaging devices 200 installed at various places. Then, the matching server 140 specifies the position of the terminal device 340 (that is, the position in the real space) in accordance with the installation position of the specified imaging device 200 and the position of the light emitter in the image captured by the imaging device 200.

Then, the matching server 140 presents the user Uf with the information in which the specifying result of the position of the terminal device 340 (in other words, the position of the user Uf holding the terminal device 340) is presented in a predetermined output form via the output unit 435 of the terminal device 340. For example, FIG. 21 illustrates an example of the information in which the specifying result of the position of the terminal device 340 is presented. Specifically, in the example illustrated in FIG. 21, the terminal device 340 presents the map information V431 indicating the current location to the output unit 345 on the basis of the information indicating the specifying result of the position of the terminal device 340 (that is, the current location) transmitted from the matching server 140. Further, at this time, the terminal device 340 may present a marker indicating the current location of the user Uf (that is, the position indicated by reference numeral P43 in FIG. 17), superimposed on the map information V431.

The example of the information processing system according to the present embodiment has been described above with reference to FIGS. 20 and 21. Incidentally, the example described above with reference to FIGS. 20 and 21 is merely an example, and a method for requesting the matching server 140 to specify the current location and a method for presenting the specifying result of the current location via the terminal device 340 are not necessarily limited to the above example.

5.5. Evaluation

As described above, in the information processing system 4 according to the present embodiment, the matching server 140 specifies the imaging device 200 that images the terminal device 340 from among the imaging devices 200 installed in various places on the basis of the first information indicating the predetermined feature quantity transmitted from the terminal device 340. Then, the matching server 140 specifies the position of the terminal device 340 in the real space on the basis of the installation position of the imaging device 200 that images the terminal device 340 and the position of the terminal device 340 in the image captured by the imaging device 200.

With the above configuration, for example, it is possible to provide a service of specifying the position of a predetermined target holding the terminal device 340 using the environmental cameras installed at various places even in places in which it is difficult to specify the current location using the GNSS or the like such as underground malls.

Incidentally, the example in which the matching server 140 specifies the target holding the terminal device 340 from the image as the terminal device 340 transmits the optical signal has been described above. On the other hand, as long as the matching server 140 can specify the target holding the terminal device 340 from the image, a method thereof is not particularly limited. For example, the terminal device 340 may encourage the user to perform, for example, a predetermined gesture of waving a hand toward the user wearing the terminal device 340, or the like and thus cause the user to perform the gesture. In this case, the matching server 140 may specify a subject who performs the gesture as the target holding the above terminal device 340 from among the images captured by the respective imaging devices 200.

6. OTHER APPLICATION EXAMPLES

Next, an application example of the information processing system according to one embodiment of the present disclosure will be described.

6.1. First Application Example: Alliance with Network Service

First, an example in which an information processing system according to one embodiment of the present disclosure allies with a network service of distributing or selling image data such as moving images or still images will be described as a first application example. For example, FIG. 22 is an explanatory diagram for describing an overview of an information processing system according to the first application example.

Figure 22:
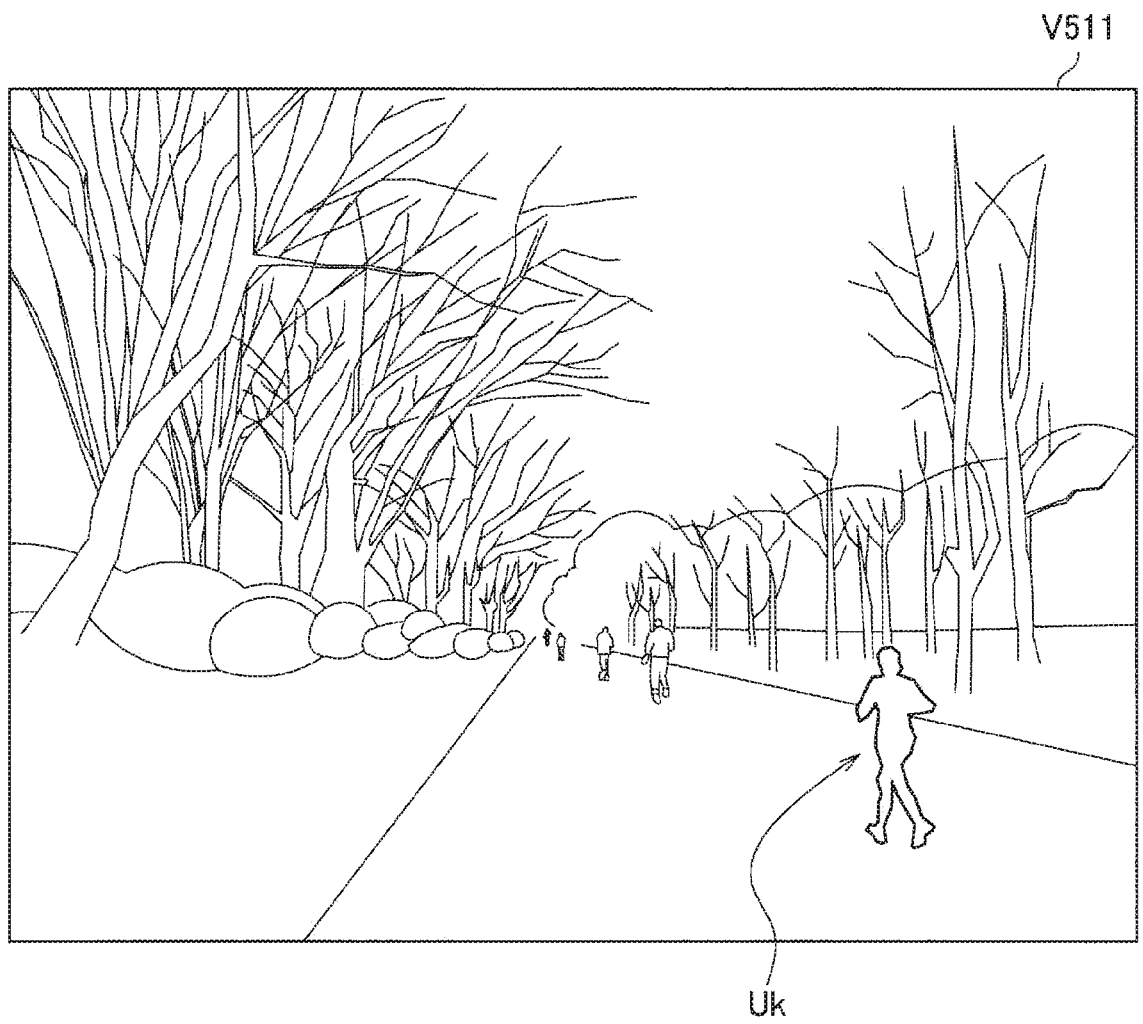
FIG. 22 is an explanatory diagram for describing an overview of an information processing system according to a first application example.

As illustrated in FIG. 22, there is a case where another user (here, a user Uk) is shown in the background of an image V511 captured by one user (here, a user Uj) with his/her camera. When the network service of delivering or selling image data with such an image as a target allies with the information processing system according to one embodiment of the present disclosure, it is possible to provide a service of searching for an image in which a predetermined target is imaged and presenting the image.

As a specific example, the matching server 100 can specify an image in which the user Uk is imaged as a subject from among images held in a predetermined server using information transmitted from the terminal device 300 held by the user Uk (that is, the information indicating a predetermined feature quantity) as a search condition. Further, at this time, the matching server 100 can also limit a range of an image to be searched for on the basis of information (for example, when, where, or the like) related to a behavior of the user Uk.

With such a configuration, for example, the user Uk searches for an image in which the user Uk is shown as the subject from among the images captured by the user Uj who do not know the user Uk in the network service of selling image data and purchase the image.

The example in which the information processing system according to one embodiment of the present disclosure allies with the network service of distributing or selling the image data such as the moving images or the still images will be described above with reference to FIG. 22 as the first application example.

6.2. Second Application Example: Extraction of Recording Result of Audio Data Next, an example in which an information processing system according to one embodiment of the present disclosure is used for extraction of a recording result of audio data will be described as a second application example. For example, FIG. 23 is an explanatory diagram for describing an overview of an information processing system according to the second application example.

Figure 23:
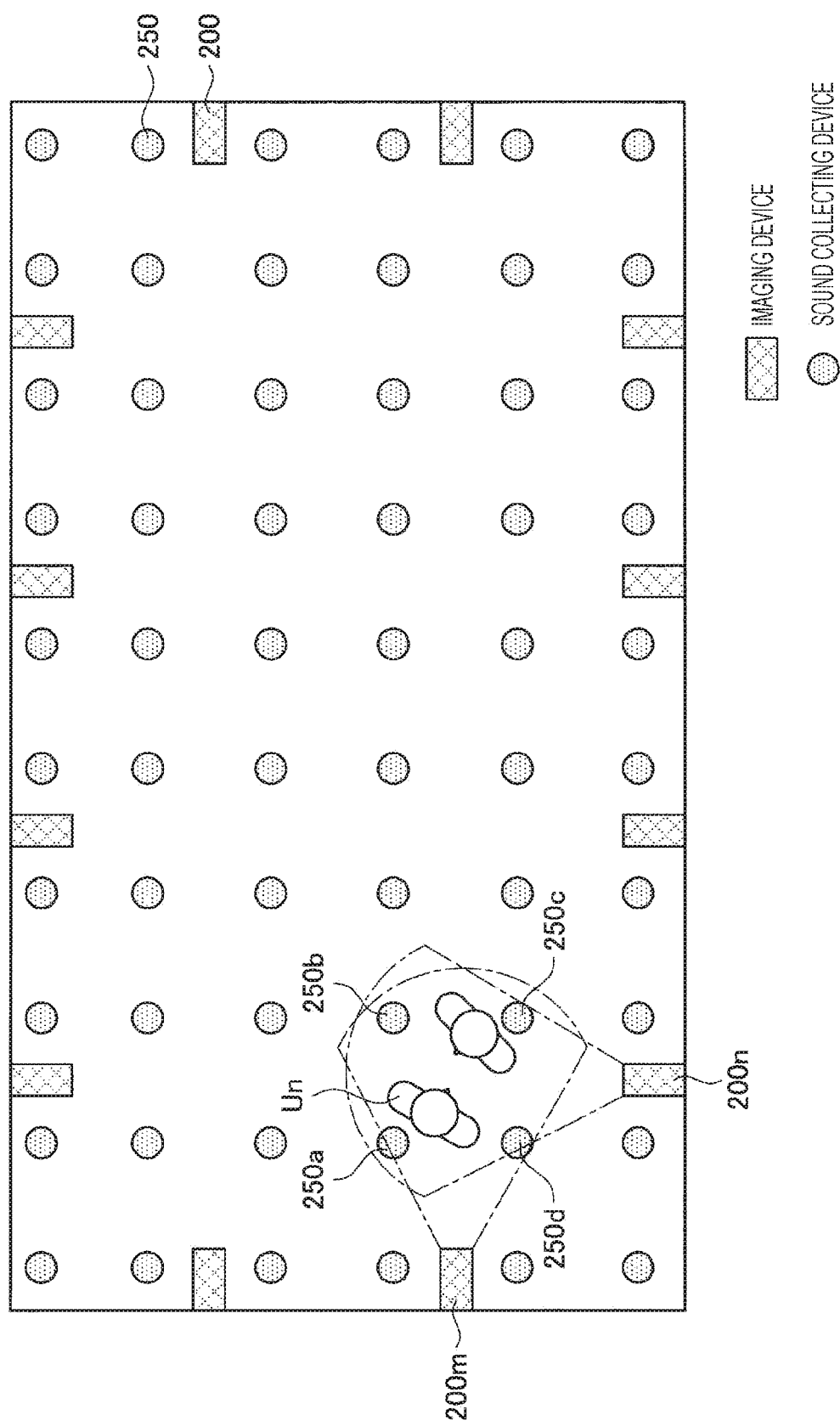
FIG. 23 is an explanatory diagram for describing an overview of an information processing system according to a second application example.

FIG. 23 is a schematic view of a predetermined space such as the inside of a room when viewed from vertically above. In other words, in the example illustrated in FIG. 23, the imaging devices 200 such as the environmental camera or the like are installed at various places in a predetermined space, and images of the various places in the space are imaged by the respective imaging devices 200. Further, sound collecting devices 250 such as a microphone are installed in various places in the space to collect surrounding sound such as voice or an environmental sound.

Under such a configuration, in the present application example, the matching server 100 specifies a position of a predetermined target holding the terminal device 300 and extracts a voice spoken by the target from among acoustic data collected by the respective sound collecting devices 250.

Specifically, first, the matching server 100 specifies a position of a predetermined target (that is, the target holding the terminal device 300) in a predetermined space on the basis of the method described above as the fourth embodiment. For example, in the case of the example illustrated in FIG. 23, the matching server 100 recognizes that a user Un is imaged by imaging devices 200*m* and 200*n* on the basis of the information indicating the predetermined feature quantity transmitted from the terminal device 300 held by the user Un. Accordingly, the matching server 100 can specify the position of the user Un in the space. Further, it is also possible to specify the positions of other users who are talking with the user Un according to image analysis.

Then, the matching server 100 specifies sound collecting devices 250*a* to 250*d* positioned around the user Un in accordance with the specifying result of the position of the user Un and extracts the voice spoken by the user Un on the basis of a sound collection result of a sound by the sound collecting devices 250*a* to 250*d*. Specifically, it is desirable for the matching server 100 to extract the voice of the user Un by suppressing noise components included in the sound collection result of the sound by the sound collecting devices 250a to 250d on the basis of sound analysis (for example, beam forming or the like) using the sound collecting devices 250a to 250d as a microphone array. Further, it is also possible to extract the voices of other users who are talking with the user Un using a similar method. Accordingly, for example, it is possible to extract a conversation in a space (for example, a room) in which many sound sources and speakers are mixed in a more clearly audible manner.

Incidentally, at least some sound collecting devices 250 among a plurality of sound collecting devices 250 that collect a voice or a sound may not be steadily installed at predetermined positions. As a specific example, a sound collecting device installed in a wearable terminal worn by each user may be used as at least some sound collecting devices 250 among the plurality of sound collecting devices 250. In this case, the position of the sound collecting device installed in each wearable terminal can be specified on the basis of the specifying result of the position of the user wearing the wearable terminal.

Further, it is also possible to individually recognize the user who is positioned at each place in a predetermined space in accordance with the information related to the feature quantity transmitted from each terminal device 300 held by each user. Therefore, for example, it is also possible to individually identify the wearable terminal worn by each user and individually extract the sound collected by the sound collecting device of the wearable terminal. Further, since each user can be recognized individually, it is also possible to control access to audio data based on the sound collection result by the sound collecting device of the wearable terminal worn by the user in accordance with whether or not the user permits it.

The example in which the information processing system according to one embodiment of the present disclosure is used for extraction of the recording result of the audio data has been described with reference to FIG. 23 as the second application example.

6.3. Third Application Example: Specifying of Moving Line of User

Next, an example in which an information processing system according to the present embodiment is used for specifying a moving line of the user will be described as a third application example.

As described above, according to the information processing system of one embodiment of the present disclosure, for example, it is possible to specify the position of the user holding the terminal device 300 even in a situation in which it is difficult to specify the position by the GNSS or the like such as an underground malls or shopping malls. Further, it is possible to individually identify the target (for example, the user) holding the terminal device 300 on the basis of the information related to the predetermined feature quantity transmitted from each terminal device 300. Therefore, it is possible to specify each user more accurately as compared with a case where the user is specified on the basis of a face, clothes, or the like of the user from the image captured by each imaging device 200, for example, using recognition technology such as image recognition.

By using such characteristics, for example, it is possible to track a change in the position of the user holding the terminal device 300 and specify the moving line of the user. In particular, according to the information processing system of one embodiment of the present disclosure, it is possible to specify the user even in a situation in which the target user is in the crowd. Therefore, it is possible to specify a moving line of a predetermined user more accurately even in a space with high traffic such as, for example, an underground mall or a shopping mall.

Incidentally, in the present application example, the user individual needs not necessarily be specified as long as the individual user can be identified. Further, the specifying result of the moving line of each user may be associated with other information related to the user. For example, when voices spoken by the user are associated with the specifying result of the moving line of each user, it is also possible to extract the voices spoken by a plurality of users at a timing at which the moving lines of the plurality of users intersect as content of a conversation among the plurality of users.

The example in which information processing system according to the present embodiment is used for specifying the moving line of the user has been described as the third application example.

6.4. Fourth Application Example: Example of System Configuration

Next, another example of a system configuration of the information processing system according to one embodiment of the present disclosure will be described as a fourth application example.

In the information processing system according to each embodiment described above, as long as it is possible to specify the target holding the terminal device 300 from the images captured by a plurality of imaging devices 200, an entity of the process related to the specifying is not particularly limited, and the system configuration is not limited to the example illustrated in FIG. 1.

Figure 24:
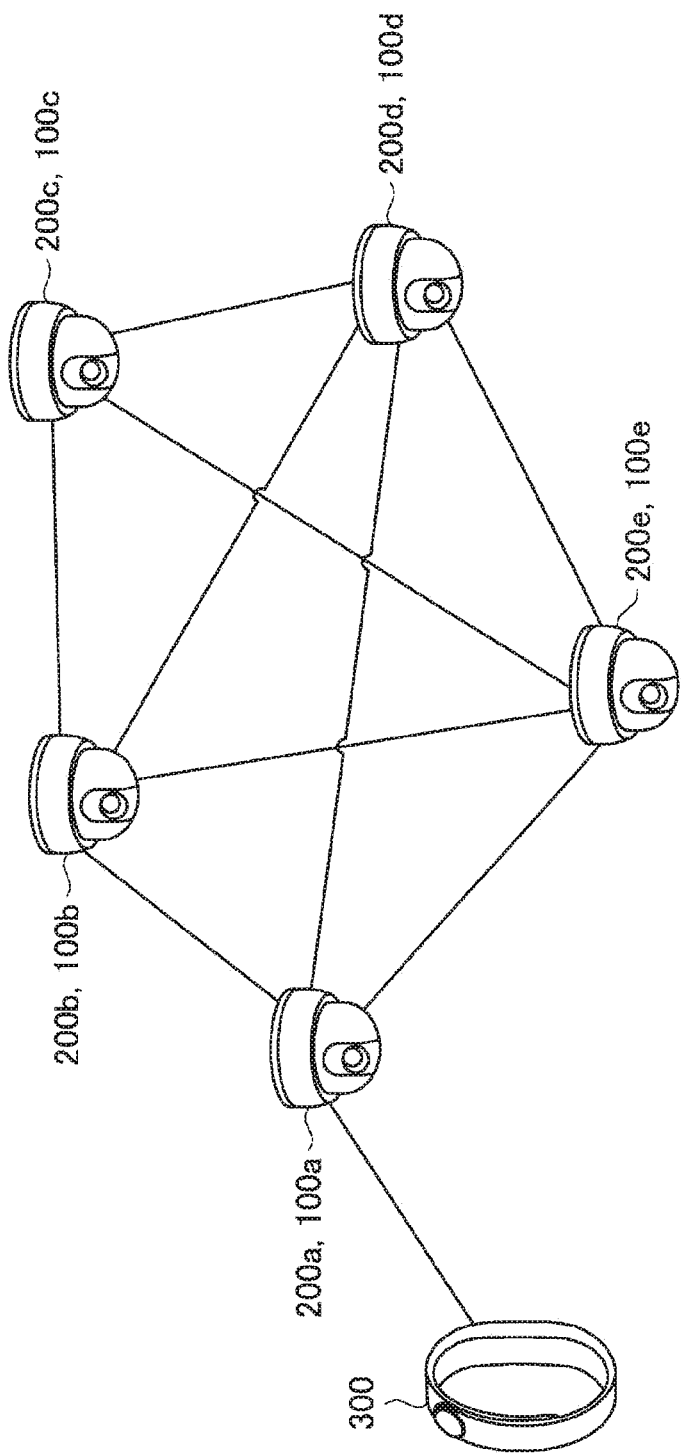
FIG. 24 is an explanatory diagram for describing an example of a system configuration of an information processing system according to a fourth application example.

For example, FIG. 24 is an explanatory diagram for describing an example of a system configuration of an information processing system according to a fourth application example. In the example illustrated in FIG. 24, an example in which a component (for example, a processing unit) corresponding to the matching server 100 is installed in a plurality of imaging devices 200 (for example, imaging devices 200a to 200e). In FIG. 24, reference numeral 100a to 100e schematically indicate components corresponding to the matching server 100 installed in the imaging devices 200a to 200e.

Under the configuration illustrated in FIG. 24, for example, each of the imaging devices 200a to 200e may individually execute specifying of the target holding the terminal device 300 from the image captured by itself, and the specifying result may be shared among the imaging devices 200a to 200e. Further, as another example, a function equivalent to the matching server 100 may be realized by a distributed process among the imaging devices 200a to 200e.

Further, the type of network connecting the imaging devices 200a to 200e is not particularly limited. As a specific example, each of the imaging devices 200a to 200e may construct a network individually with the other imaging devices 200 without going through a server or the like. As a more specific example, there is an example in which the imaging devices 200a to 200e construct a so-called ad hoc network. Further, as another example, the imaging devices 200a to 200e may be connected via a predetermined network such as the Internet, a LAN, a WAN, or the like.

Of course, the example described above is merely an example, and the configuration of the information processing system is not particularly limited as long as it is possible to realize the functions of the information processing system according to each embodiment described above. As a specific example, some of the components included in the matching server 100 (for example, the analysis processing unit 103 and the output control unit 105 or the like illustrated in FIG. 3) may be installed on the image collecting server 400 side. Further, the image collecting server 400 and some imaging devices 200 may be integrally configured.

Another example of the system configuration of the information processing system according to one embodiment of the present disclosure has been described above with reference to FIG. 24 as the fourth application example.

7. HARDWARE CONFIGURATION

Figure 25:
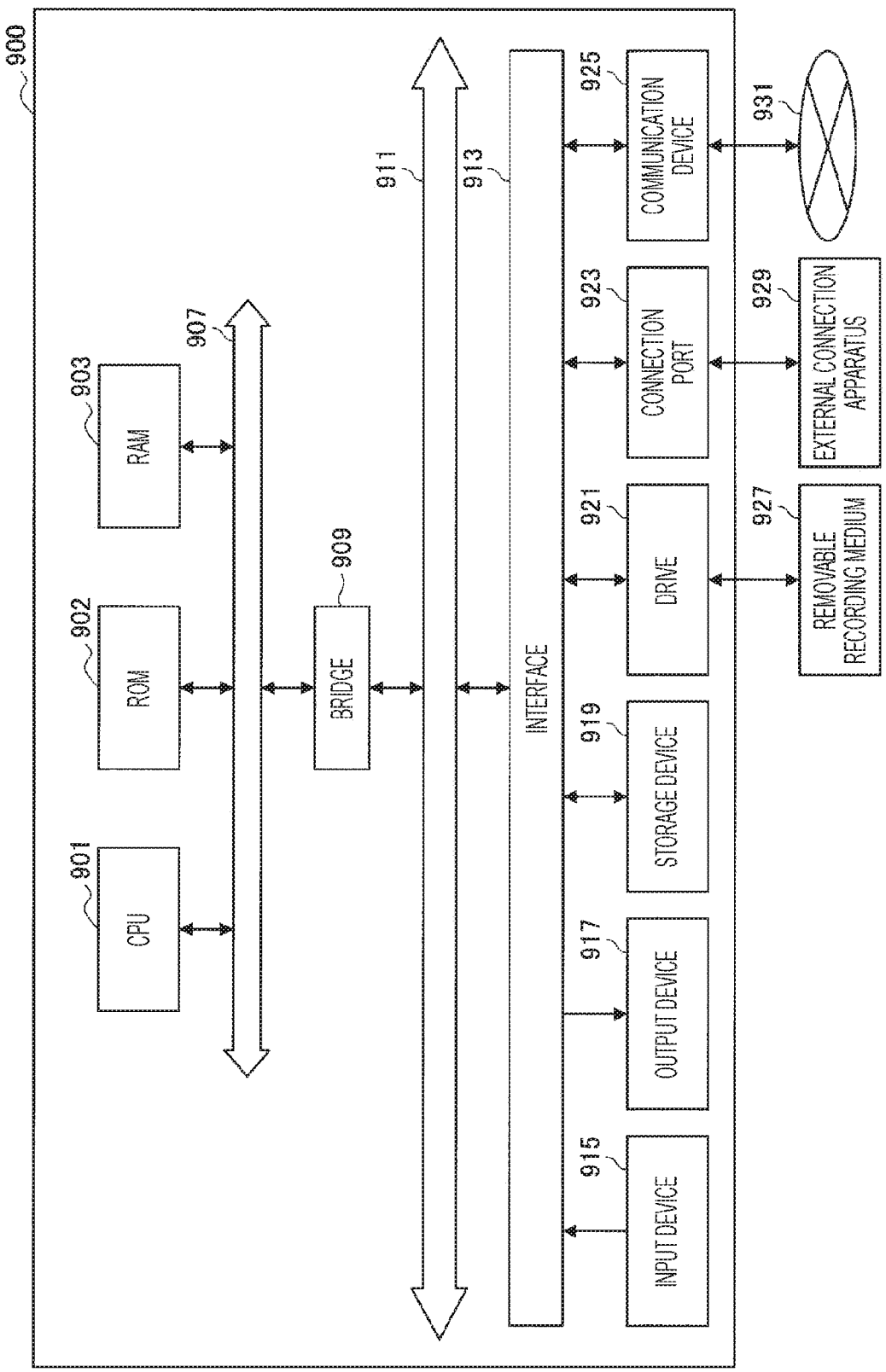
FIG. 25 is a functional block diagram illustrating a configuration example of a hardware configuration of an information processing device that constitutes a communication system according to one embodiment of the present disclosure.

Next, an example of a hardware configuration of the information processing device that constitutes the information processing system according to one embodiment of the present disclosure as the matching server 100, the terminal device 300, and the image collecting server 400 described above will be described in detail with reference to FIG. 25. FIG. 25 is a functional block diagram illustrating an example of a hardware configuration of an information processing device that constitutes a communication system according to one embodiment of the present disclosure.

An information processing device 900 that constitutes a communication system according to the present embodiment mainly includes a CPU 901, a ROM 902, and a RAM 903. Further, the information processing device 900 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device, and controls all or some of operations of the information processing device 900 in accordance with various types of programs recorded in the ROM 902, the RAM 903, the storage device 919, or a removable recording medium 927. The ROM 902 stores programs used by the CPU 901, calculation parameters, and the like. The RAM 903 primarily stores programs used by the CPU 901, parameters that change appropriately in executing the programs, and the like. These are connected to one another via the host bus 907 configured by an internal bus such as a CPU bus. For example, the terminal information collecting unit 101, the analysis processing unit 103, and the output control unit 105 illustrated in FIG. 3 may be implemented by the CPU 901.

The host bus 907 is connected to the external bus 911 such as a peripheral component interconnect/interface (PCI) bus via the bridge 909. Further, the input device 915, the output device 917, the storage device 919, the drive 921, the connection port 923, and the communication device 925 are connected to the external bus 911 via the interface 913.

The input device 915 is an operation means operated by the user such as a mouse, a keyboard, a touch panel, a button, a switch, a lever, or a pedal. Further, the input device 915 may be, for example, a remote control means (a so-called remote controller) using infrared rays or other radio waves or may be an external connection apparatus 929 such as a mobile phone or a PDA corresponding to an operation of the information processing device 900. Further, the input device 915 includes, for example, an input control circuit or the like that generates an input signal on the basis of information input by the user using the operation means and outputs the signal to the CPU 901. By operating the input device 915, the user of the information processing device 900 can input various types of data to the information processing device 900 and instruct the information processing device 900 to perform a processing operation.

The output device 917 includes a device that can notify the user of acquired information visually or aurally. Examples of such devices include a display device such as a CRT display device, a liquid crystal display device, a plasma display device, an EL display device, or a lamp, an audio output device such as a speaker or a headphone, a printer device, and the like. The output device 917 outputs, for example, a result obtained by various processes performed by the information processing device 900. Specifically, the display device displays a result obtained by various processes performed by the information processing device 900 in the form of a text or an image. On the other hand, the audio output device converts an audio signal including reproduced audio data, acoustic data, or the like into an analog signal and outputs it. For example, the output unit (for example, the display or the like) of the output device 500 illustrated in FIG. 3 may be constituted by the output device 917.

The storage device 919 is a device for data storage which is configured as an example of the storage unit of the information processing device 900. Examples of the storage device 919 include a magnetic storage unit device such as a hard disk drive (HDD), a semiconductor storage device, an optical storage device, a magneto-optical storage device, or the like. The storage device 919 stores programs executed by the CPU 901, various types of data, and the like. For example, the storage unit 401 illustrated in FIG. 3 may be configured by the storage device 919.

The drive 921 is a recording medium reader/writer and is installed in the information processing device 900 or externally attached to the information processing device 900. The drive 921 reads out information recorded in the mounted removable recording medium 927 such as a magnetic disk, an optical disk, a magneto-optical disk, or a semiconductor memory and outputs the information to the RAM 903. Further, the drive 921 can also write a record in the mounted removable recording medium 927 such as a magnetic disk, an optical disk, a magneto-optical disk, or a semiconductor memory. Examples of the removable recording medium 927 include a DVD medium, an HD-DVD medium, a Blu-ray (registered trademark) medium, or the like. Further, the removable recording medium 927 may be a compact flash (registered trademark) (CF), a flash memory, a secure digital (SD) memory card), or the like. Further, the removable recording medium 927 may be, for example, an integrated circuit (IC) card or an electronic device in which a non-contact IC chip is installed.

The connection port 923 is a port for establishing a direct connection with the information processing device 900. Examples of the connection port 923 include a universal serial bus (USB) port, an IEEE 1394 port, a small computer system interface (SCSI) port, and the like. As another example of the connection port 923, an RS-232C port, an optical audio terminal, a high-definition multimedia interface (HDMI (registered trademark)) port, or the like may be used. As the external connection apparatus 929 is connected to the connection port 923, the information processing device 900 directly acquires various types of data from the external connection apparatus 929 or provides various types of data to the external connection apparatus 929.

The communication device 925 is, for example, a communication interface configured of a communication device or the like for establishing a connection with a communication network (network) 931. The communication device 925 is, for example, a communication card or the like for a wired or wireless local area network (LAN), Bluetooth (registered trademark), or wireless USB (WUSB). Further, the communication device 925 may be a router for optical communication, a router for asymmetric digital subscriber line (ADSL), a modem for various types of communications, or the like. For example, the communication device 925 can perform transmission and reception of signals or the like with the Internet or other communication devices in accordance with a predetermined protocol such as a TCP/IP. Further, the communication network 931 connected to the communication device 925 may be configured by a network or the like connected in a wired or wireless manner and may be, for example, the Internet, a home LAN, infrared communication, radio wave communication, satellite communication, or the like.

An example of the hardware configuration that can realize the functions of the information processing device 900 that constitutes the communication system according to the present disclosure embodiment of the present disclosure has been described above. Each of the components described above may be constituted using a general-purpose member or may be constituted by hardware specialized for the function of each component. Therefore, it is possible to change the hardware configuration to be used appropriately in accordance with a technical level at the time when the present embodiment is implemented. Incidentally, although not illustrated in FIG. 25, it will be appreciated that various components corresponding to the information processing device 900 constituting the information processing system are installed.

Incidentally, it is possible to create a computer program for realizing the respective functions of the information processing device 900 that constitutes the information processing system according to the present embodiment described above and install the computer program in a personal computer or the like. Further, a computer readable recording medium with such a computer program stored therein can be provided. Examples of the recording medium include a magnetic disk, an optical disk, a magneto-optical disk, a flash memory, and the like. Further, the computer program may be distributed, for example, via a network without using a recording medium. Further, the number of computers that execute the computer program is not particularly limited. For example, a plurality of computers (for example, a plurality of servers or the like) may execute the computer program in coordination with one another.

8. CONCLUSION

Although the exemplary embodiments of the present disclosure have been described in detail with reference to the appended drawings, the technical scope of the present disclosure is not limited to such examples. It will be obvious to those skilled in the art of the present disclosure that various modifications or alterations can be made within the scope of the technical spirit described in claims set forth below and are naturally understood to belong to the technical scope of the present disclosure.

Further, the effects described in this specification are merely explanatory or illustrative and not limiting. In other words, the technology according to the present disclosure may exhibit other effects apparent to those skilled in the art from the description of this specification, in addition to or instead of the effects described above.

Further, the above description has proceeded with the example in which the user (that is, the person) holding the terminal device 300 is set as the target, and the target is specified from the images captured by a plurality of imaging devices 200. On the other hand, the target needs not necessarily be a person as long as it is possible to specify the target holding the terminal device 300 on the basis of the information related to the predetermined feature quantity transmitted from the terminal device 300. As a specific example, it is also possible to deal various solid objects accompanied by movement such as moving bodies (for example, vehicles or the like), animals (for example, pets, livestock, or the like) as the target to be specified from an image.

Incidentally, the following configurations also belong to the technical scope of the present disclosure.

(1)

An information processing device, including:

an acquiring unit that acquires information related to a feature quantity specifying a predetermined target transmitted from a terminal device held by the target;

a specifying unit that specifies the target on the basis of the information related to the feature quantity from among images captured by at least some of a plurality of imaging devices installed at different positions; and a control unit that presents information related to the target to a predetermined output destination in accordance with a specifying result of the target from the image.

(2)

The information processing device according to (1), in which the acquiring unit acquires information related to a position of the target, and the specifying unit specifies at least some imaging devices among the plurality of imaging devices in accordance with the information related to the position of the target and specifies the target from the images captured by the specified imaging devices.

(3)

The information processing device according to (2), in which the specifying unit specifies the target from the image captured at a corresponding time by the specified imaging device in accordance with the information related to the position of the target of each time.

(4)

The information processing device according to (2) or (3), in which the acquiring unit acquires, from the terminal device, information corresponding to a detection result of a motion of the terminal device as the information related to the feature quantity, and the specifying unit specifies the target from the image on the basis of the detection result of the motion of the terminal device and an analysis result of the image.

(5)

The information processing device according to (2) or (3), in which the acquiring unit acquires, as the information related to the feature quantity, information corresponding to a pattern of a predetermined signal transmitted from the terminal device, and the specifying unit specifies the target from the image on the basis of the information corresponding to the pattern of the signal.

(6)

The information processing device according to (5), in which the signal is an optical signal, the acquiring unit detects the optical signal from the image and acquires information corresponding to a light emission pattern of the optical signal as the information related to the feature quantity, and the specifying unit specifies the target from the image on the basis of the information corresponding to the light emission pattern.

(7)
The information processing device according to (1), in which the acquiring unit acquires, from the terminal device, a recording result of information transmitted from at least some of the plurality of imaging devices, and the specifying unit specifies the target from the images captured by the at least some imaging devices on the basis of the acquired recording results.

(8)
The information processing device according to (7), in which the acquiring unit acquires the recording result associated with predetermined information from the terminal device, and the specifying unit specifies the imaging device that images the target on the basis of the recording result and the predetermined information and specifies the target from the image captured by the specified imaging device.

(9)
The information processing device according to (8), in which the predetermined information includes time information, and the specifying unit specifies the imaging device that images the target at a time indicated by the time information on the basis of the time information and the recording result and specifies the target from the image captured by the specified imaging device.

(10)
The information processing device according to any one of (7) to (9), in which the information transmitted from the at least some imaging devices is information identifying the imaging devices.

(11)
The information processing device according to (1), in which the acquiring unit acquires the information related to the feature quantity on the basis of an analysis result of the images captured by at least some imaging devices among the plurality of imaging devices, and the specifying unit acquires information related to a position of the target on the basis of a specifying result of the target from the image based on the information related to the acquired feature quantity and the information related to the position of the imaging device that images the image.

(12)
The information processing device according to (11), in which the control unit presents the acquired information related to the position of the target to a predetermined output destination as the information related to the target.

(13)
The information processing device according to (11) or (12), in which the control unit presents the information related to the target acquired by another device corresponding to the position to a predetermined output destination in accordance with the acquired information related to the position of the target.

(14)
The information processing device according to (13), in which the other device is a sound collecting device that collects a sound, and the control unit presents a sound collection result of a voice of the target by one or more of the sound collecting devices corresponding to the position to a predetermined output destination as the information related to the target in accordance with the acquired information related to the position of the target.

(15)
The information processing device according to any one of (1) to (14), in which the control unit restricts access to the image in accordance with the specifying result of the target from the image.

(16)
The information processing device according to (15), in which the control unit permits access to one or more images captured by the at least some imaging devices among the plurality of imaging devices to one or more users related to the target specified from at least some images among the one or more images.

(17)
The information processing device according to any one of (1) to (16), in which the control unit performs image processing on the image in accordance with the specifying result of the target from the image.

(18)
The information processing device according to any one of (1) to (17), in which the at least some imaging devices among the plurality of imaging devices are steadily installed at predetermined positions.

(19)
An information processing method performed by a computer, including:

acquiring information related to a feature quantity specifying a predetermined target transmitted from a terminal device held by the target;

specifying the target on the basis of the information related to the feature quantity from among images captured by at least some of a plurality of imaging devices installed at different positions; and presenting information related to the target to a predetermined output destination in accordance with a specifying result of the target from the image.

(20)
A program causing a computer to execute:

acquiring information related to a feature quantity specifying a predetermined target transmitted from a terminal device held by the target;

specifying the target on the basis of the information related to the feature quantity from among images captured by at least some of a plurality of imaging devices installed at different positions; and presenting information related to the target to a predetermined output destination in accordance with a specifying result of the target from the image.

REFERENCE SIGNS LIST 1, 2, 4 Information processing system
100, 120, 140 Matching server
101, 121 Terminal information collecting unit
103, 123, 143 Analysis processing unit
105, 125, 145 Output control unit
141 Request receiving unit
200 Imaging device
250 Sound collecting device
300, 320, 340 Terminal device
301, 321, 341 Feature information transmitting unit
303 Position information acquiring unit
325 Signal receiving unit
345 Output unit
400 Image collecting server
401 Storage unit
435 Output unit
500 Output device

The invention claimed is:

1. An information processing device, comprising:
a central processing unit (CPU) configured to:
acquire information related to a feature quantity, wherein
the feature quantity specifies a target,
the feature quantity is transmitted from a terminal device, and
the terminal device is held by the target;
acquire information related to a position of the target;
acquire, from the terminal device, information corresponding to a detection result of a motion of the terminal device as the information related to the feature quantity;
specify, based on the information related to the position of the target, at least one imaging device of a plurality of imaging devices installed at different positions;
specify the target from a first image of a plurality of images based on the detection result of the motion of the terminal device and an analysis result of the first image, wherein the plurality of images is captured by the specified at least one imaging device;
specify the target from a second image of the plurality of images captured at a corresponding time by the specified at least one imaging device based on the information related to the position of the target at the corresponding time; and
present information related to the target to a specific output destination based on a specifying result of the target from each of the first image and the second image.

2. The information processing device according to claim 1, wherein the CPU is further configured to:
acquire, as the information related to the feature quantity, information corresponding to a pattern of a specific signal transmitted from the terminal device; and
specify the target from a third image of the plurality of images based on the information corresponding to the pattern of the specific signal.

3. The information processing device according to claim 2, wherein the specific signal is an optical signal, and the CPU is further configured to:
detect the optical signal from the third image;
acquire information corresponding to a light emission pattern of the optical signal as the information related to the feature quantity; and
specify the target from the third image of the plurality of images based on the information corresponding to the light emission pattern.

4. The information processing device according to claim 1, wherein the CPU is further configured to:
acquire, from the terminal device, a recording result of information transmitted from the at least one imaging device of the plurality of imaging devices; and
specify the target from the plurality of images captured by the at least one imaging device of the plurality of imaging devices based on the acquired recording result.

5. The information processing device according to claim 4, wherein the CPU is further configured to:
acquire the recording result associated with specific information from the terminal device;
specify the at least one imaging device that images the target based on the recording result and the specific information; and
specify the target from a fourth image of the plurality of images captured by the specified at least one imaging device.

6. The information processing device according to claim 5, wherein the specific information includes time information, and the CPU is further configured to:
specify the at least one imaging device that images the target at a time indicated by the time information, wherein the at least one imaging device is specified based on the time information and the recording result; and
specify the target from a fifth image captured by the specified at least one imaging device.

7. The information processing device according to claim 4, wherein the information transmitted from the at least one imaging device is information identifying the plurality of imaging devices.

8. The information processing device according to claim 1, wherein the CPU is further configured to:
acquire the information related to the feature quantity based on an analysis result of the plurality of images captured by the at least one imaging device of the plurality of imaging devices; and
acquire information related to the position of the target based on the specifying result of the target from the first image, wherein the specifying result corresponds to the information related to the feature quantity and the information related to a position of the at least one imaging device that images the first image.

9. The information processing device according to claim 8, wherein the CPU is further configured to present the acquired information related to the position of the target to a specific output destination as the information related to the target.

10. The information processing device according to claim 8, wherein the CPU is further configured to present the information related to the target acquired by a specific device to a specific output destination based on the acquired information related to the position of the target.

11. The information processing device according to claim 10, wherein the specific device is a sound collecting device that collects a sound, and the CPU is further configured to present a sound collection result of a voice of the target by at least one sound collecting device to a specific output destination as the information related to the target based on the acquired information related to the position of the target.

12. The information processing device according to claim 1, wherein the CPU is further configured to restrict access to the first image based on the specifying result of the target from the first image.

13. The information processing device according to claim 12, wherein
the CPU is further configured to permit access to the plurality of images captured by the at least one imaging device of the plurality of imaging devices, and
the access is permitted to at least one user related to the target specified from the first image of the plurality of images.

14. The information processing device according to claim 1, wherein the CPU is further configured to execute image processing on the first image based on the specifying result of the target from the first image.

15. The information processing device according to claim 1, wherein the at least one imaging device of the plurality of imaging devices are steadily installed at specific positions.

16. An information processing method, comprising:
acquiring information related to a feature quantity, wherein
- the feature quantity specifies a target,
- the feature quantity is transmitted from a terminal device, and
- the terminal device is held by the target;

acquiring information related to a position of the target;

acquiring, from the terminal device, information corresponding to a detection result of a motion of the terminal device as the information related to the feature quantity;

specifying, based on the information related to the position of the target, at least one imaging device of a plurality of imaging devices installed at different positions;

specifying the target from a first image of a plurality of images based on the detection result of the motion of the terminal device and an analysis result of the first image, wherein the plurality of images is captured by the specified at least one imaging device;

specifying the target from a second image of the plurality of images captured at a corresponding time by the specified at least one imaging device based on the information related to the position of the target at the corresponding time; and presenting information related to the target to a specific output destination based on a specifying result of the target from each of the first image and the second image.

17. A non-transitory computer-readable medium having stored thereon computer-executable instructions that, when executed by a processor, cause the processor to execute operations, the operations comprising:

acquiring information related to a feature quantity, wherein
- the feature quantity specifies a target,
- the feature quantity is transmitted from a terminal device, and
- the terminal device is held by the target;

acquiring information related to a position of the target;

acquiring, from the terminal device, information corresponding to a detection result of a motion of the terminal device as the information related to the feature quantity;

specifying, based on the information related to the position of the target, at least one imaging device of a plurality of imaging devices installed at different positions;

specifying the target from a first image of a plurality of images based on the detection result of the motion of the terminal device and an analysis result of the first image, wherein the plurality of images is captured by the specified at least one imaging device;

specifying the target from a second image of the plurality of images captured at a corresponding time by the specified at least one imaging device based on the information related to the position of the target at the corresponding time; and presenting information related to the target to a specific output destination based on a specifying result of the target from each of the first image and the second image.

* * * * *